US009955233B1

(12) United States Patent
Levy

(10) Patent No.: US 9,955,233 B1
(45) Date of Patent: Apr. 24, 2018

(54) METHODS AND APPARATUS FOR PROVIDING CLOUD SERVICES TO CUSTOMER PREMISE DEVICES

(71) Applicant: Charter Communications Operating, LLC, St. Louis, MO (US)

(72) Inventor: Devin P. Levy, Centennial, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 15/594,596

(22) Filed: May 13, 2017

(51) Int. Cl.
*H04H 60/32* (2008.01)
*H04N 21/647* (2011.01)
*H04L 12/24* (2006.01)
*H04L 12/26* (2006.01)
*H04L 29/08* (2006.01)
*H04L 27/34* (2006.01)
*H04N 21/426* (2011.01)
*H04N 21/61* (2011.01)
*H04N 21/482* (2011.01)
*H04N 21/472* (2011.01)
*H04N 21/478* (2011.01)

(52) U.S. Cl.
CPC ....... *H04N 21/64723* (2013.01); *H04L 27/34* (2013.01); *H04L 41/0213* (2013.01); *H04L 43/10* (2013.01); *H04L 67/16* (2013.01); *H04N 21/42676* (2013.01); *H04N 21/6168* (2013.01); *H04N 21/64707* (2013.01); *H04N 21/478* (2013.01); *H04N 21/47202* (2013.01); *H04N 21/482* (2013.01)

(58) Field of Classification Search
CPC ....... H04N 21/64723; H04N 21/42676; H04N 21/6168; H04N 21/64707; H04N 21/47202; H04N 21/478; H04N 21/482; H04L 27/34; H04L 41/0213; H04L 43/10; H04L 67/16
See application file for complete search history.

(56) References Cited

U.S. PATENT DOCUMENTS

| 9,425,818 B1* | 8/2016 | Rajaee | H03M 3/32 |
| 2015/0095961 A1* | 4/2015 | Kliger | H04N 17/004 725/107 |

* cited by examiner

Primary Examiner — Oleg Asanbayev
(74) Attorney, Agent, or Firm — Straub & Straub; Michael P. Straub; Stephen T. Straub

(57) ABSTRACT

Methods and apparatus for adjusting QAM levels used for providing cloud services to customer premise devices on a per customer premise device basis based on determined communication channel signal to noise ratios. One exemplary method embodiment of providing cloud services to a customer premise device (CPE) includes the steps of: determining a signal to noise (SNR), at a first time, on a first communications channel between a network node and the CPE; selecting based on the SNR a cluster node from a plurality of cluster nodes to use to provide a cloud service to the CPE using a second communications channel, at least a first cluster node and a second cluster node in the plurality of cluster nodes using different Quadrature Amplitude Modulation (QAM) levels to communicate with customer premise devices, and using the selected cluster node to provide the cloud service to the CPE.

16 Claims, 17 Drawing Sheets

METHODS AND APPARATUS FOR PROVIDING CLOUD SERVICES TO CUSTOMER PREMISE DEVICES

FIELD OF INVENTION

The present invention relates to methods and apparatus for providing cloud services to customer premise equipment (CPE) devices such as, for example, set-top boxes and in particular for providing cloud services to CPE devices during periods in which the communication/transmission channel over which the cloud services are provided is experiencing less than optimal signal to noise ratios.

BACKGROUND OF THE INVENTION

Today, there are a variety of content distribution networks such as cable networks that utilize customer premise equipment (CPE) devices utilizing cloud based services, e.g., programming guide services, digital television programming services, on-demand services including video on-demand (VOD), MPEG video services, gaming services, and internet protocol services, to provide services and content to its customers/subscribers. By using cloud based services, the processing and memory requirements of the CPE devices, e.g., set-top boxes can be reduced along with the complexity and cost of the CPE devices. This is so because processing and activities that were once typically preformed in the CPE device are now being performed in network node and servers in the cloud in response to requests from the CPE resulting in reduced complexity and costs for the CPE devices. For example, programming guide information may be stored in the cloud and only provided upon request to a CPE device rather than being updated and provided to all CPE devices on an on-going basis.

Furthermore, customers' demands and expectations for services have also been increasing. The ability to bring ever larger amounts of services (e.g., cloud based services including providing content and information) in a reliable way to an increasing number of customers/subscribers cheaply and efficiently is an on-going objective of network operators and directly affects a network operator's ability to sustain its customer/subscriber base and overall profitability.

With respect to content distribution networks, e.g., cable networks, customer satisfaction is critical to maintain a customer base and requires that the network operate as close to optimal as possible and to avoid service interruption. One of the technical problems with providing cloud based services is that when the signal to noise levels on the communications/transmission channels are lower than optimal levels, cloud sessions will drop and customers will have an interruption in service. These interrupted cloud sessions will be noticed when a customer tries to access a cloud based service and is unable to or having already accessed a cloud based service such as for example, video on-demand service, and is exited from the cloud based session. In many instances, once the cloud session is dropped the CPE device will undergo a spontaneous reset or reboot in order to re-establish the connectivity with the cloud network. Service interruptions and spontaneous CPE device reboots are the leading reason for customer service complaints and dispatching of technicians to investigate reported problems.

From the above discussion, it should be appreciated that there is a need for new and improved methods and apparatus for providing efficient cost effective means for providing cloud based services without interruptions.

SUMMARY OF THE INVENTION

The present invention addresses, among other things, the above discussed need for providing efficient cost effective means for providing cloud based services without interruptions.

The present invention provides methods, systems, and apparatus for adjusting QAM levels used for providing cloud services to customer premise devices on a per customer premise device basis based on determined communication channel signal to noise ratios. Empirical test data has shown that the use of lower QAM levels used to provide cloud services allow for higher noise on the communication channel prior to a cloud session being interrupted and/or terminated due to an excessive amount of noise on the communications channel. Various embodiments of the invention allow the QAM level used to provide cloud services to an individual customer premise equipment device to be adjusted so as to avoid customer's loss or interruption of cloud services and/or spontaneous resets/reboots of customer premise equipment resulting from loss, interruption or impairment of a communications channel used to provide a cloud service to the customer premise equipment device. When an SNR of a communication channel is determined that indicates an impairment of the communications channel used to provide the cloud services to a customer premise equipment device, the QAM level used to provide the cloud services is lowered and when the SNR ratio of the communications channel is determined to indicate the impairment is gone or has been reduced the QAM level is adjusted to a higher QAM level. While a lower QAM level provides a reduced quality of service in connection with the cloud services provided it allows customers to be provided with continuous cloud service which is preferred to cloud service interruptions. The ability to adjust the QAM level to lower and higher levels allows for providing the customer with the best determined quality of service based on the indicated signal to noise ratio. It also reduces and/or eliminates cloud service interruptions due to low SNR levels which can be compensated for by lowering the QAM level which in turn reduces customer call in complaints and need to dispatch service technicians resulting in cost savings to the cable operator. While various features and elements are described in this summary all features and elements are not necessary or required for all embodiments of the invention.

In some embodiments, individual cloud nodes use a single QAM level to service all devices receiving service from the cloud node. Rather than lower the QAM level used by a first cloud node to communicate with devices when one of the communications channels to a device being provided service is effected by a bad SNR, the session suffering from the bad SNR level is switched to another cloud node which uses a lower QAM modulation level, preferably prior to an interruption in service, leaving the other devices being serviced by the first cloud node to continue operating at the higher QAM level supported by the first cloud node.

One exemplary method of providing cloud services to at least a first customer premise device (e.g., STB), in accordance with an embodiment of the present invention includes the steps of: determining a first signal to noise ratio (SNR), at a first time, on a first communications channel between a first network node and a first interface of the first customer premise device; selecting based on the first signal to noise ratio a first selected one of a plurality of cluster nodes to use to provide at least a first cloud service via a second interface of the first customer premise device using a second communications channel, at least a first cluster node and a second cluster node in the plurality of cluster nodes using different Quadrature Amplitude Modulation (QAM) levels to communicate with customer premise devices, said first cloud service including at least one of a program guide service (electronic program guide EPG), video on demand service, or a call identification service (caller ID service); and using the first selected one of the plurality of cluster nodes to provide the first cloud service to the first customer premise device.

In some embodiments, when the SNR for first communication channel is less than 35 dBmv a cluster node with a 64 QAM level is selected to provide cloud services to the first customer premise equipment device and when a SNR corresponding to the first communications channel is more equal to or more than 35 dBmv a cluster node with a 256 QAM level is selected to provide cloud services to the first customer premise equipment device.

In some embodiments, the first communication channel used by first node and the first customer device is identified through an IP address used by the first customer premise device.

In some method embodiments, the method further includes the steps of: determining a second signal to noise ratio on the first communications channel, at a second time, said second time following said first time; and making a decision whether or not to switch from the first selected one of the plurality of cluster nodes to another one of the plurality of cluster nodes, the another one of the plurality of cluster nodes using a different quadrature amplitude modulation level to communicate with customer premise devices than the first selected one of the plurality of cluster nodes.

In another embodiment, the step of making a decision to switch includes deciding to switch to a second one of the cluster nodes which uses a low QAM level when said second signal to noise ratio on the first communications channel is below a first signal to noise threshold used to control switching to a cluster node using a low QAM modulation level.

In some embodiments, the step of making a decision to switch includes deciding to switch to one of the cluster nodes which uses a high QAM level (e.g., a 256 QAM level which is higher than a 64 QAM level used by the cluster node which uses a low QAM level to communicate to customer premise devices) when said second signal to noise ratio on the first communications channel is above a second signal to noise threshold used to control switching to a cluster node using a high QAM modulation level. In some embodiments, the first and second signal to noise thresholds having different values so as to avoid frequent switching below cluster nodes.

In some embodiments, the first and second communications channels share a physical link for at least a portion of said first and second communications channels.

The invention also includes systems and apparatus which are used to implement one or more steps of the aforementioned methods.

A particular exemplary system embodiment in accordance with the present invention includes a system of providing cloud services to at least a first customer premise device (e.g., STB), the system including: a first network node; a first customer premise device having a first and second interface; a plurality of cluster nodes, said plurality of cluster nodes including at least a first cluster node and a second cluster node using different Quadrature Amplitude Modulation (QAM) levels to communicate with customer premise devices; and a cluster controller including: memory; and a processor that is configured to control the operation of the cluster controller to: determine a first signal to noise ratio, at a first time, on a first communications channel between the first network node and the first interface of the first customer premise device; and select a first selected one of the plurality of cluster nodes to use to provide at least a first cloud service via the second interface of the first customer premise device using a second communications channel, said first cloud service including at least one of a program guide service (electronic program guide EPG), video on demand service, or a call identification service (caller ID service); and wherein said first selected one of the plurality of cluster nodes provides the first cloud service to the first customer premise device.

Numerous additional features, benefits and embodiments are discussed in the detailed description which follows.

DETAILED DESCRIPTION

Figure 1:
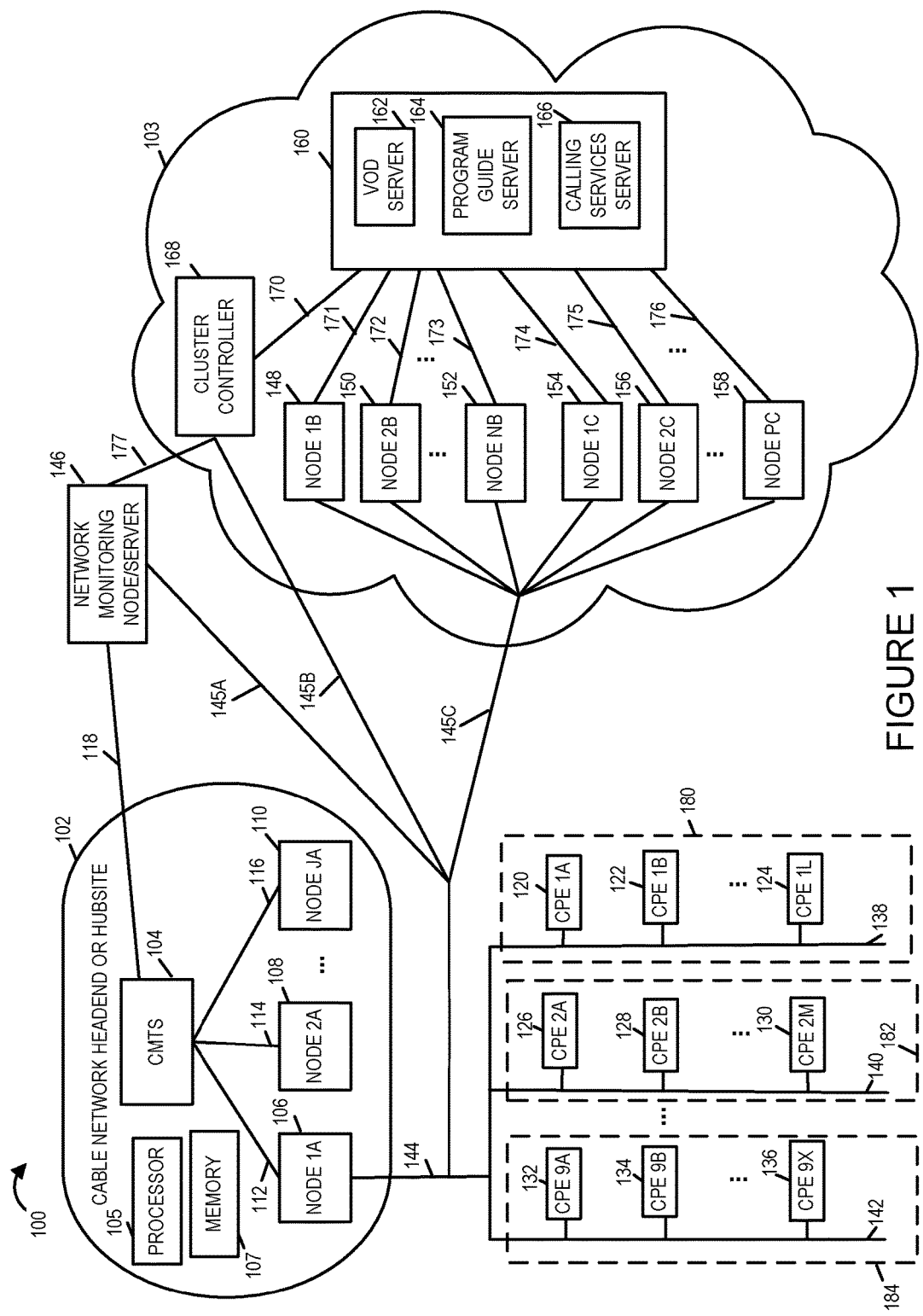
FIG. 1 illustrates an exemplary content distribution network system 100 that provides cloud based services implemented in accordance one embodiment of the present invention.

The current invention is applicable to various content distribution network architectures that provide cloud based services. One exemplary system network architecture used to implement an exemplary embodiment in accordance with the present invention is shown in FIG. 1. Such a network typically includes a headend, hub sites, customer premise equipment (CPE) devices, a cloud based network with clusters of cloud nodes, a cluster controller, and one or more cloud service servers, and a communications network with limited bandwidth, e.g., a cable network.

The headend is controlled by an operator, e.g., a Multiple Systems Operator (MSO), that determines what content is to be distributed to its customers/subscribers. Headends are generally centrally located systems while hub sites are network nodes that are typically located in close proximity to the CPE devices to which they are connected and support. The switching gear, servers, Quadrature Amplitude Modulation (QAM) modulators and other equipment contained within a hub site are sometimes referred to as edge devices because they are located at the edge of the content distribution network. In some instances hubsites are not used and the headend includes the switching gear, servers, QAM modulators and other equipment typically contained in the hubsite.

A set of modulators, e.g., Quadrature Amplitude Modulation (QAM) modulators, usually located in the hub site but can be located in the headend are assigned to a service group so that messages e.g., content and control signals, can be modulated and sent to the CPE devices.

FIG. 1 illustrates an exemplary content distribution network 100 having an architecture implemented in accordance with the present invention. The exemplary system 100 includes a network headend or hubsite 102, e.g., a cable network headend which may be located at a single building site, a Cable Modem Termination System (CMTS) 104, a plurality of J nodes where J is a positive number including node 1A 106, node 2A 108, ..., node JA 110, e.g., edge distribution devices including one or more Quadrature Amplitude Modulators, a plurality of customer premise equipment devices, e.g., set-top boxes, located on a plurality of different customer premises, a network monitoring node/server/device 146, a network cloud 103 including a cluster controller 168, a plurality of cloud nodes, and one or more cloud services servers/nodes/devices and a plurality of communications links for coupling the various components/nodes/servers/devices of the system together. The headend or hubsite 102 includes processor 105 and memory 107 which both to each other and to the other devices included in the headend or hubsite 102. The headend or hubsite typically includes a variety of other components/devices such as routers, switches, interfaces, controllers which have not been shown so as to simply the system 100 for explanatory purposes.

Processor 105 of headend or hubsite 102, may, and in some embodiments does, execute software program instructions stored in memory 107 to control hardware and/or software in the headend or hubsite 102 to manage the receipt, processing, and transmission of traffic such as control and content data signals into and out of the headend or hubsite 102. The term headend/hubsite 102 as used herein refers to the implementation of the node 102 as either a headend or a hubsite. It should be understood that the node 102 may be either a headend or a hubsite.

The system includes a plurality of communications links 112, 114, 116, 118, 145A, 145B, 145C, 138, 140, 142, 170, 171, 172, 173, 174, 175, 176, 177 which couple the various nodes, servers, devices and components of the system together and allow for the transmission of signals among and between the various nodes, servers, devices and components of the system. The type of physical transmission medium of the one or more links may, and in some embodiments does, vary. Exemplary links include wired and wireless links, e.g., fiber-optic cables, coaxial cables, satellite transmissions, microwaves and radio frequency waves. In one exemplary embodiment the communications links 112, 114, 116, 138, 140, 142, 144, 145A, 145B, 145C are RF coaxial cables.

Each of network nodes 1A 106, 2A 108 and JA 110 are coupled via communications links to one or more customer premise equipment devices although for simplicity in explaining the invention in the exemplary embodiment only node 1A 106 is shown as being coupled to customer premise equipment devices.

Exemplary system 100 includes a plurality of customer premises 180, 182, ..., 184. Each of the customer premises includes one or more customer premise equipment devices coupled to the cloud network 103 and the CMTS 104 via communications links. In the exemplary system embodiment 100, customer premise 180 includes customer premise equipment devices CPE 1A 120, CPE 1B 122, ..., CPE 1L 124 where L is a positive integer number which are coupled to node 1A 106 via communications links 138 and 144 and via node 1A 106 and communication link 112 to CMTS 104. The customer premise equipment devices CPE 1A 120, CPE 1B 122, ..., CPE 1L 124 are coupled to networking monitoring node/server/device 146 via communications links 138, 144, and 145A. The customer premise equipment devices CPE 1A 120, CPE 1B 122, ..., CPE 1L 124 are coupled to cloud cluster controller 168 via communications links 138, 144, and 145B. The customer premise equipment devices CPE 1A 120, CPE 1B 122, ..., CPE 1L 124 are coupled to the cloud distribution node 1B 146, node 2B 150, ..., node NB 152, node 1C 154, node 2C 156, ..., node PC 158 via communications links 138, 144, and 145C.

Similarly, in the exemplary system embodiment 100, customer premise 182 includes customer premise equipment devices CPE 2A 126, CPE 2B 128, ..., CPE 2M 130 (where M is a positive integer number) which are coupled to node 1A 106 via communications links 140 and 144. These CPE devices are also coupled to CMTS 104 communications links 140 and 144, node 1A 106 and communication link 112. The customer premise equipment devices CPE 2A 126, CPE 2B 128, ..., CPE 2M 130 are coupled to networking monitoring node/server/device 146 via communications links 140, 144, and 145A. The customer premise equipment devices CPE 2A 126, CPE 2B 128, ..., CPE 2M 130 are coupled to cloud cluster controller 168 via communications links 140, 144, and 145B. The customer premise equipment devices CPE 2A 126, CPE 2B 128, ..., CPE 2M 130 are coupled to the cloud distribution node 1B 146, node 2B 150, ..., node NB 152, node 1C 154, node 2C 156, ..., node PC 158 via communications links 140, 144, and 145C.

In the exemplary system embodiment 100, customer premise 184 includes customer premise equipment devices CPE 9A 132, CPE 9B 134, . . . , CPE 9X 136 which are coupled to node 1A 106 via communications links 142 and 144. These CPE devices are also coupled to CMTS 104 via communications links 142 and 144, node 1A 106 and communication link 112. The customer premise equipment devices CPE 9A 132, CPE 9B 134, . . . , CPE 9X 136 are coupled to networking monitoring node/server/device 146 via communications links 142, 144, and 145A. The customer premise equipment devices CPE 9A 132, CPE 9B 134, . . . , CPE 9X 136 are coupled to cloud cluster controller 168 via communications links 142, 144, and 145B. The customer premise equipment devices CPE 9A 132, CPE 9B 134, . . . , CPE 9X 130 are coupled to the cloud distribution node 1B 146, node 2B 150, . . . , node NB 152, node 1C 154, node 2C 156, . . . , node PC 158 via communications links 142, 144, and 145C.

Figure 4:
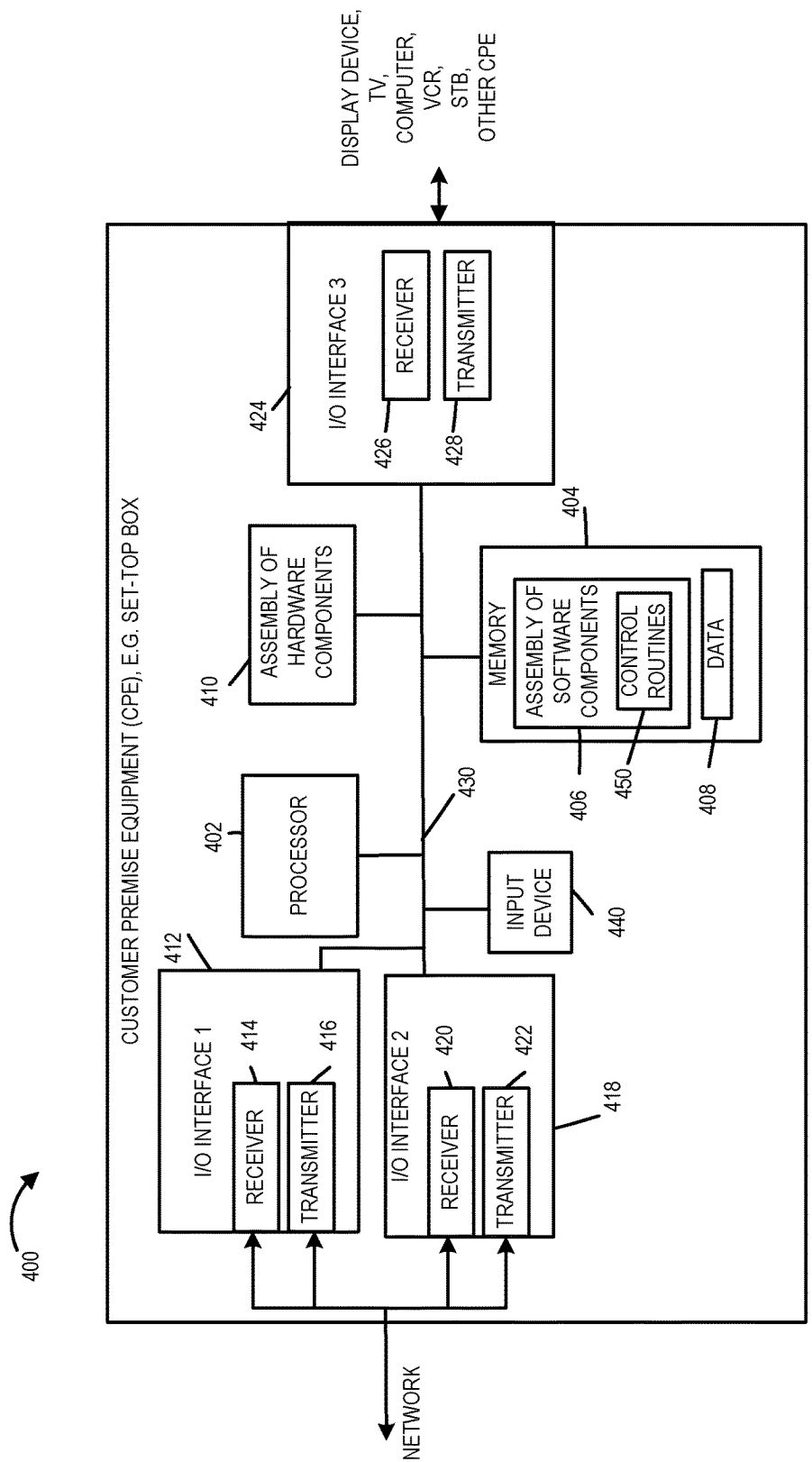
FIG. 4 illustrates some of the implementation details of an exemplary Customer Premise Equipment (CPE) device in accordance with one embodiment of the present invention.

Customer Premise Equipment (CPE) refers to any type of electronic device located in a customer's premises or other suitable location and is coupled to the content distribution network. Exemplary CPE devices include set-top boxes, digital video recorders (DVRs), televisions, cable modems, embedded multimedia personal adapters (eMTAs), and personal computers. FIG. 4 discussed in detail below depicts some of the implementation details of an exemplary Customer Premise Equipment (CPE) device 400 in accordance with one embodiment of the present invention. One or more of the customer premise equipment devices may, and in some embodiments are, set-top boxes.

The CMTS 104 is a device which is used to provide high speed data services as Internet service to cable customers/subscribers. The CMTS 104 in the exemplary embodiment includes Ethernet interfaces that connect to the connect to an Internet Protocol (IP) network, such as for example the Internet as well as radio frequency (RF) interfaces that connected to the cable network, e.g., coaxial cables or hybrid fiber coax. Traffic, e.g., information, content, messages, sent from the Internet to a CPE device of a cable subscriber is received at the CMTS 104 is carried in IP packets encapsulated according to the DOCSIS standard with the IP packets carried on data streams modulated onto a communications channel typically using either a 256-QAM or 64-QAM quadrature amplitude modulation scheme. The CPE device receives and demodulates the traffic at the CPE device. Traffic sent from the CMTS 104 to a CPE device is referred to as downstream traffic and the communications channel over which the traffic is transmitted is referred to as a downstream communications channel. The term communications channel is also sometimes referred to as a transmission channel. Sometimes the downstream channel from the CMTS to the CPE device is referred to as a TV channel.

Traffic from a CPE device, e.g., CPE 1A 120, to the CMTS 104 or device connected to the IP network with which the CMTS interfaces, e.g., the Internet device, is referred to as upstream traffic and is carried in Ethernet frames encapsulated inside DOCSIS frames modulated with QPSK, 16-QAM, 32-QM, 64 QAM or 128-QAM using TDMA, ATDMA or S-CDMA frequency sharing mechanisms.

The network monitoring node/server/device 146 monitors the signal to noise level or signal to noise ratio (SNR) on the communications channels between the CMTS 104 and one or more of the plurality of customer premises devices the CMTS 104 is in communication with. In some embodiments it monitors the signal to noise levels on each of the communications channels between the CMTS 104 and the customer premises devices the CMTS 104 communicates with. In the system 100 that includes the plurality of customer premise devices which include CPE 1A 120, CPE 1B 122, . . . , CPE 1L 124, CPE 2A 126, CPE 2B 128, . . . , CPE 2M 130, CPE 9A 132, . . . , CPE 9B, 134, . . . , CPE 9X 136. In some embodiments, the network monitoring node/server continuously monitors the signal to noise level or SNR of the downstream communications/transmission channel from the CMTS 104 device to a first interface on the customer premises equipment devices with which it is communicating. In some embodiments, the continuous monitoring includes determining the SNR of the downstream communications channel with a customer premises equipment device by requesting the customer premise equipment device provide the SNR of the downstream communications channel to the network monitoring node/server 146 for example through polling of the CPE device using Simple Network Management Protocol (SNMP) messages. SNMP polling of CPE devices by the network monitoring node/server provides on demand real time information about the CPE signaling and noise levels without adversely affecting the network. SNMP traffic is by default set to best effort in the class of service parameter of the CMTS so the polling would carry little network traffic. In some embodiments, the network monitoring node/server 146 monitors or determines communication channel signaling levels of the CPE devices from the CMTS 104. In some embodiments, the network monitoring node/server monitors and/or determines the SNR of the upstream communications channel between the CPE devices and the CMTS 104 by requesting and/or polling the CMTS 104 for the upstream communications channel SNR. In some embodiments, the network monitoring node/server uses the Bridge Control Protocol (BCP) to monitor the communications channels signal and noise levels and/or SNR between the CPE devices and the CMTS 104. In some embodiments, the an application residing on the CPE devices is used to monitor the communications channels signal and noise levels and/or SNR between the CPE devices and the CMTS 104.

Exemplary headend/hubsite 102 includes a plurality of devices/components, e.g., which include input/output (I/O) interfaces, memory storage, e.g., memory 107, one or more processors, e.g., processor 105, and communication links for controlling the operation of the headend/hubsite 102. Information, data, signals and content is outputted from headend/hubsite 102 which may, and in some embodiments does, include one or more transmitters and/or receivers to link 144. The headend/hubsite 102 contains a variety of components including devices/components for managing and allocating bandwidth to provide requested services, (e.g., switched digital video services), servers, switches/routers, and nodes 1A 106, node 2A 108, . . . , node JA 110 which include modulators (e.g., Quadrature Amplitude Modulation (QAM) modulators)) which are used to selectively provide the requested services to one or more CPE devices supported by headend/hub site 102 based upon one or more service requests, the priority of those service requests, and the amount of bandwidth available on the link connecting the requesting CPE devices to the hub site 102.

System 100 also includes cloud network 103 for providing cloud services to the CPE devices of the systems. Cloud services include for example, video on-demand services, program guide services and calling services. Calling services including providing caller identifier information to CPE devices with incoming calls such as voice over Internet Protocol calls. The cloud services off-load processing and memory requirements of the customer premise equipment devices lower the cost and complexity of the CPE devices to which they provide services. The use of cloud services can also increase network efficiency and reduce network traffic and congestion by only providing information and services on an as needed basis. For example, updating and transmission of program guide information over the network to CPE devices need only occur when requested from the CPE device instead of on a constant on-going basis regardless of whether the CPE device is active or not or needs requires the updated information. Cloud network 103 includes a cluster controller 168 coupled to a cloud server 160 and a cluster of cloud production nodes. The cluster of cloud production nodes include node 1B 148, node 2B 150, . . . , node NB 152, node 1C 154, node 2C 156, . . . , node PC 158 where N and P are positive integer numbers which may be the same but are typically different.

The cloud production nodes are cloud edge devices that are coupled to and provide cloud services, e.g., traffic such as information, content and messages, to a plurality of CPE devices. Each of the cloud production nodes includes one or more QAM modulators (sometimes referred to as delivery QAM modulators) that operate at a particular QAM level, typically 256 Quadrature Amplitude Modulation (QAM) or 64 QAM for the modulation of traffic, e.g., content, information and messages to be communicated to the CPE devices the production node is supporting. While 256 QAM and 64 QAM levels are typically used for downstream traffic other QAM levels may be employed such as for example 32 QAM or 16 QAM levels.

During operation each cloud production node typically has hundreds of active cloud sessions in progress at the same time wherein downstream traffic including information, content and messages are modulated using the same QAM level and then communicated over a plurality of downstream communications channels from the cloud production node to a plurality of different CPE devices located in a plurality of different customer premises. Because the QAM modulators of each production node are supporting a plurality of CPE devices it is not possible to dynamically adjust the QAM level for a single CPE device with poor signal to noise levels/SNR levels because adjusting a QAM level for one CPE device results in an adjustment for all CPE devices supported by the production number.

In the exemplary system 100 embodiment, cloud node 1B 148, cloud node 2B 150, . . . , cloud node NB, each include 256 QAM modulators for modulating information, content and messages to be sent to the CPE devices to which it is providing cloud services. In the exemplary system 100, the cloud node 1C 154, node 2C 154, . . . , node PC 158 include 64 QAM modulators for modulating information modulating information, content and messages to be sent to the CPE devices to which it is providing cloud services. In some embodiments, production node 1C 154 includes 64 QAM modulators, production node 2C 156 includes 32 QAM modulators, and Node PC 158 includes 16 QAM modulators. Having cloud production nodes with different QAM levels allows the system to adjust the QAM level used for communicating information from the cloud to an individual CPE device by changing the production node communicating with the CPE device as will be explained in further detail below in connection with FIGS. 2A, 2B, 2C, 2D, 2E, 2F, and 2G.

Cloud production nodes 1B 148, 2B 150, . . . , NB 152, 1C 154, 2C 156, . . . , PC 158 are coupled to cloud services server 160 via communications links 171, 172, . . . , 173, 174, 175, . . . , 178 respectively. The cloud productions nodes are also connected via communications links to the cluster controller 168.

The cloud server 160 includes one or more cloud services servers. In the exemplary embodiment, the cloud server 160 includes a video on-demand server 162, a program guide server 164, a calling services server 166. In some embodiments, cloud server 160 is not used and individual cloud servers are instead directly coupled to the production nodes and/or are directly addressable by the cloud production nodes of the cluster and cluster controller. The cluster server 160 is coupled to the cluster controller via the communications link 170.

In some embodiments, the cloud server 160 is not a separate server that supports each of the production nodes of the cluster but instead each production node of the cluster includes a cloud server 160.

The cluster controller 168 controls the operation of the cluster of production nodes and cloud services server 160. The cluster controller operates to control the establishment of the cloud sessions between the CPE devices and the production nodes of the cluster. For example, during cloud session initiation the cluster controller assigns a CPE device cloud session to a production node of the cluster for example based upon the determined signal to noise level or SNR of the communication channel, e.g., downstream communication channel between the CMTS 104 and the CPE device requesting the initiation of a cloud session. The cluster controller 168 also controls the re-assignment of active CPE cloud sessions from one production node of the cluster e.g., production node 1B 148, to another production node of the cluster, e.g., production node 1C 154. Such re-assignment of active CPE cloud sessions being based on the determined signal to noise level or SNR of a communication channel between the CMTS 104 and the CPE device to which the production node is providing cloud services.

It is to be understood that communication links shown in system 100 are only exemplary and other network configurations and communications links may be employed that couple together the devices, servers, nodes and controllers of the system.

Elements or steps with the same reference numbers used in different figures are the same or similar and those elements or steps will not be described in detail again.

Figure 2:
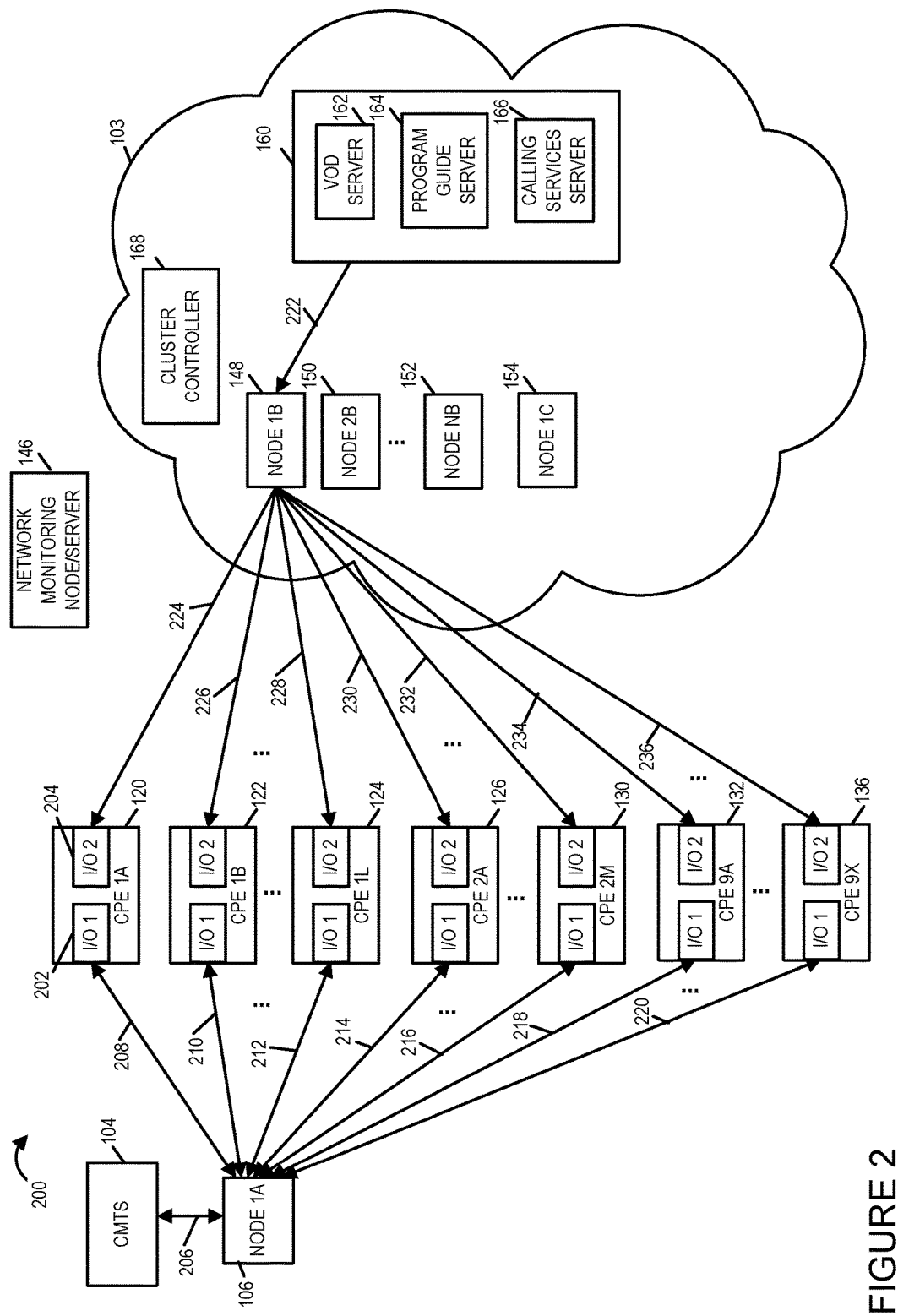
FIG. 2 illustrates various exemplary communication channels and signals communicated during the operation of the content distribution network system 100 of FIG. 1.
Figure 3:
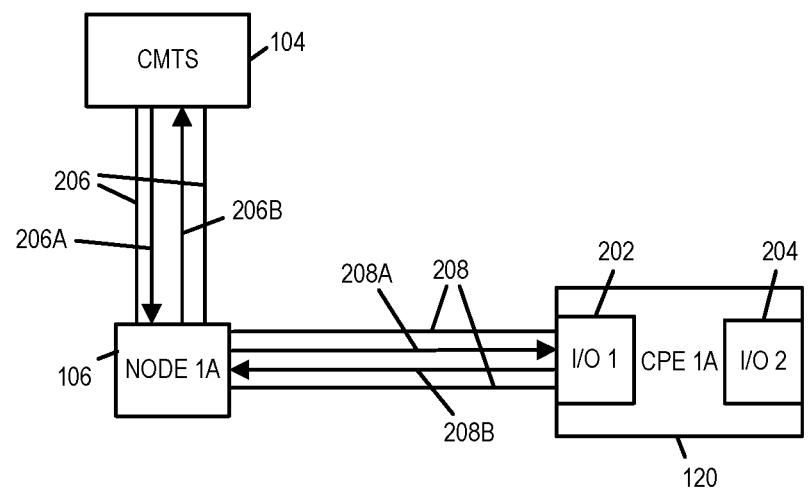
FIG. 3 illustrates portions of exemplary system 100 in greater detail.

FIG. 3 illustrates portions of exemplary system 100 in greater detail. The communications channels between the CMTS 104, node 1A, and CPE 1A will now be explained in greater detail. A communications channel 206 is established between the CMTS and the node 1A 106. A communications channel 208 is established between node 1A 106 and the CPE 1A 120 Input/Output (I/O) 202 which is assigned a first primary Internet Protocol address. The communications channel 206 includes a downstream communications channel 206A and an upstream communications channel 206B. The communications channel 208 includes a downstream communications channel 208A and an upstream communications channel 208B. Signals, e.g., messages, information, data, transmitted from the CMTS 104 to the CPE 1A device 120 is sent from an RF interface on the CMTS 104 via the downstream communications channel 206A via the node 1A 106 and via the downstream communications channel 208A to the I/O 1 interface 202 of the CPE 1A 120 were it is received. Signals, e.g., messages, information, data, transmitted from the CPE 1A 120 is sent via the upstream communications channel 208B via the node 1A 106 via the upstream communications channel 206B to an RF interface on the CMTS 104 where it is received. Each of the CPE devices has assigned to it by the CMTS 104 two IP addresses a primary IP address and a second IP address. The primary IP address is used for communications with the CMTS 104 and the secondary IP address is used for communications for cloud sessions established between the CPE device and the cloud network 103. For example, in FIG. 3 CPE 1A 120 has a first I/O interface I/O 1 202 which is assigned the primary IP address and a second I/O interface I/O 2 204 which is assigned the secondary IP address. The cloud production node which is in communication with CPE 1A 120 uses the secondary IP address to communicate with the CPE 1A 120 on the I/O 2 204 as shown in FIG. 2.

FIG. 4 illustrates some of the details of an exemplary CPE device 400. CPE device 400 includes a processor 402, e.g., a CPU, an input device 440, e.g. keypad or wireless remote and receiver, an assembly of hardware components 410, e.g., circuits corresponding to different components, a memory 404, an I/O Interface 3 424 for interfacing to one or more output devices, e.g., display devices, television sets (TVs), computers, video cassette recorders (VCR), digital video recorders (DVRs), set top boxes (STBs), WIFI devices, routers, and other CPE devices, input/output interfaces, I/O Interface 1 412 and I/O Interface 2 418, which couple the CPE device to a cable network via link 138 of FIG. 1, and an coupled together via a bus 209 over which the various elements may interchange data and information. internal communication link 430 over which various elements within the CPE device may interchange data, data, and control signals. Memory 404 includes an assembly of software components 406, and data/information 408. The I/O interface 1 412 includes transmitter 416 and receiver 414. The I/O interface 2 418 includes transmitter 422 and receiver 420. The I/O interface 3 424 includes transmitter 428 and receiver 426 for communicating with other devices, e.g., a display device such as a television. One of the components of the CPE device 400 is typically a modem, e.g., a DOCSIS cable modem. The assembly of software components 406 includes a control routines component 450 which includes instructions which when executed by the processor 402 control the operation of the CPE device 400 such as for example to perform one or steps of various embodiments such as the steps of method embodiment 600 of FIG. 6.

Memory 404 is used to store data as well as program instructions for the processor 402. Data is stored in data storage 408. In some embodiments of the present invention, CPE memory 404 may, and does include various types of software instructions including for example operating system software, client application software, program guide software, encoding/decoding software, encrypting/decrypting software, etc. CPE 400 sometimes also contains various specialized software components and/or hardware components or circuits including ICs, digital signal processors, ASICs that perform one or more dedicated functions such as encoding and/or decoding MPEG-2 message streams, encrypting/decrypting messages, etc. In some embodiments, CPE 400 contains software and/or hardware making complaint with various standards and/or platforms such as the OCAP (open cable application platform). In some embodiments the CPE 400 includes an application that determines or generates the signal to noise ratio on communications channels established between one or more of the I/O Interfaces of the CPE 400 device and external devices and transmits the SNR generated values to other devices such as network monitoring node/server 148. In some embodiments, the CPE 400 includes software instructions to support the SNMP protocol and/or BCG protocols.

Figure 5:
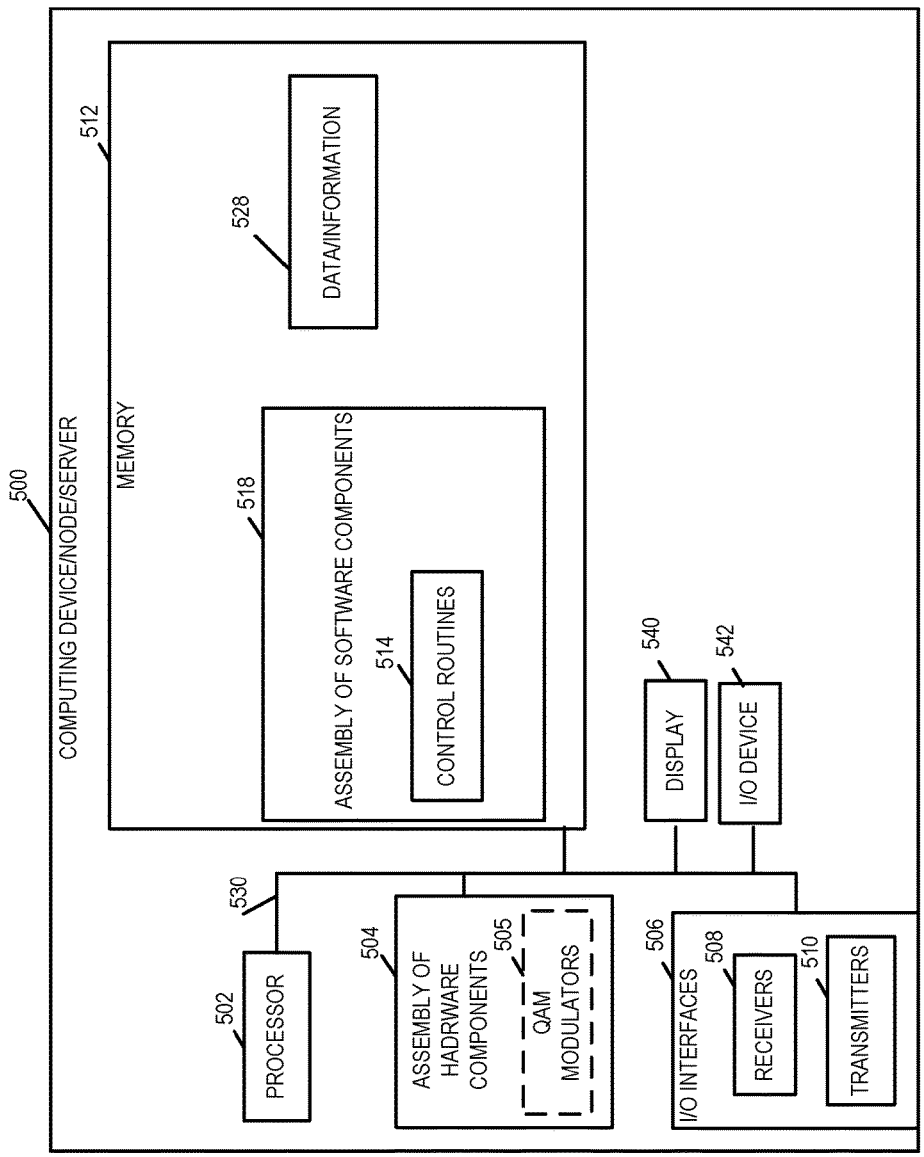
FIG. 5 illustrates some of the components of an exemplary computing device/node/server in accordance with one embodiment of the present invention.

FIG. 5 illustrates some of the components of an exemplary computing device/node/server in accordance with one embodiment of the present invention. The computing device/node/server 500 includes a display 540, an input device 542, a processor 502, e.g., a CPU, for executing instructions, an assembly of hardware components 504 for performing various functions and steps of the present invention discussed in the flowchart of FIG. 6, a memory 512, Input/Output (I/O) Interfaces 506 and a communications bus 530 which couples processor 502, assembly of hardware components 504, e.g., circuits corresponding to different components, memory 512 and I/O interfaces 506 together and over which the various elements may interchange data and information. The I/O Interfaces 306 include receivers 508 and transmitters 510 for communicating over the communication bus 530 internally and over any external networks to which the computing device 500 is connected including for example, the cable network or cloud network links of system 100 of FIG. 1.

Memory 512 is used to store assembly of software components 518 and data/information 528. The assembly of software components includes a control routines component 514 which includes instructions which when executed by the processor 502 control the operation of the computing device/node/server 500 such as for example to perform one or more steps of the method 600 of FIG. 6. The assembly of hardware components includes optional Quadrature Amplitude Modulators, e.g., 256 QAM modulators, 64 QAM modulators or other level QAM modulators.

The CMTS 104, network nodes 1A 106, 2A 108, . . . , JA 110, Network Monitoring Node/Server 146, Cluster Controller 168, Cloud Services Server 160, VOD Server 162, Program Guide Server 164, Calling Services Server 166, Cluster nodes 1B 148, 2B 150, . . . , NB 152, 1C 154, 2C 156, . . . , PC 158 may be, and in some embodiments are, implemented in accordance with the exemplary computing device/node/server 500 wherein the control routine component includes instructions for controlling the operation of the device/node/server to implement one or more steps of the various embodiments described, e.g., one or more steps of method 600. The computing device/node/server 500 refers to a computing device, node or server.

Signaling diagram 200 of FIG. 2 illustrates various signals between elements of the system 100 of FIG. 1 at a first time when cloud sessions have been established between various CPE devices of the system 100. For explanatory purposes simplified signaling connections and request and response messages are depicted with the messages and information contained therein illustrated which are most pertinent to explaining the exemplary embodiment of the invention. As it will be appreciated additional information and formatting of the messages and/or signals as well as the use of additional messages/signaling may be and typically is used in initiating and communicating among entities using cloud sessions and maintaining communications between the various elements of the system.

Communications channel 206 includes a downlink communications channel 206A and an uplink communications channel 206B over CMTS 104 and network node 1A 106 communicate. Signals 208, 210, 212, 214, 216, 218, and 220 represent uplink and downlink signals communicated between the node 1A 106 and CPE devices 1A 120, CPE 1B 122, . . . , CPE 1L 124, CPE 2A 126, . . . , CPE 2M 130, CPE 9A 132, . . . , CPE 9X 136 respectively. These CPE devices are in the service group supported by the network node 1A 106. The node 1A 106 communicates with the I/O 1 Interface of each of these CPE devices. Signal 222 represents the cloud services data, information, and messages, e.g., VOD stream, EPG guide data, caller ID data, being sent from the cloud services server 160 and its VOD server 162, program guide server 164 and calling services server 166 to cloud cluster node 1B 148 to be transmitted to CPE devices 120, 122, . . . , 124, 126, . . . , 130, 132, . . . , 136 in response to cloud service requests from the CPE devices. Signals 224, 226, . . . , 228, 230, . . . , 232, 234, . . . , are cloud services data, information, and messages being transmitted to the CPE devices 1A 120, CPE 1B 122, . . . , CPE 1L 124, CPE 2A 126, . . . , CPE 2M 130, CPE 9A 132, . . . , CPE 9X 136 respectively. The cluster node 1B 148 supports providing services to each of these CPE devices. The cluster node 1B 148 contains 256 QAM modulators and communicates these signals using 256 QAM to each of the CPE devices to which it provides delivery of cloud services. The node 1B 148 is not capable of using more than one QAM level to send data, information, and messages to the CPE devices it is supporting.

Figure 2A:
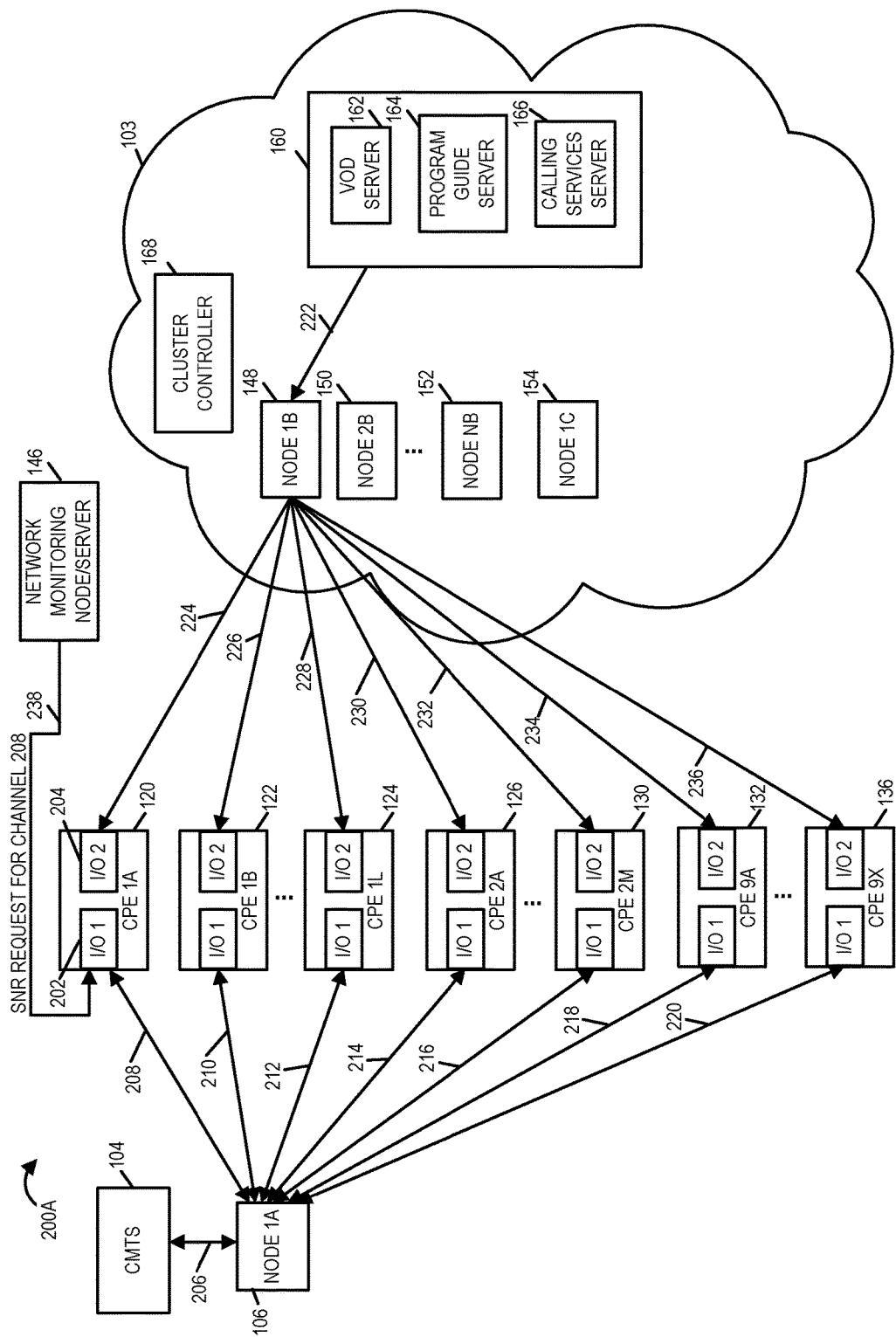
FIG. 2A illustrates various exemplary communications channels and signals used in one method embodiment of the present invention.

Signaling diagram 200A illustrated in FIG. 2A shows network monitoring node/server 146 at the first time send signal 238 to the first I/O 1 Interface 202 on CPE 1A 120. Signal 238 is a request for the signal to noise ratio on channel 208 and in particular for downlink channel 208A. The request may be, and in some embodiments is, a SNMP polling request that would not adversely affect the network as SNMP traffic is by default set to Best effort in the class of service parameter of the CMTS, so this would result in little network traffic load. It should be noted that while the signal is shown as being sent directly to the CPE 1A I/O 1 interface 202, the signal may, and in some embodiments does pass through CMTS 104 and node 1A 106. In some embodiments, the request from the network monitoring node/server 146 is a request sent to an application residing on CPE 1A 120. In response to receiving the request for SNR on downlink communications channel 208A, the CPE 1A 120 generates and/or determines the SNR for communications channel 208A at the first time. In some embodiments, the CPE 1A 120 may already have generated the requested SNR for communications channel 208A and may in such cases not generate a new SNR if the previously generated SNR is not considered stale.

Figure 2B:
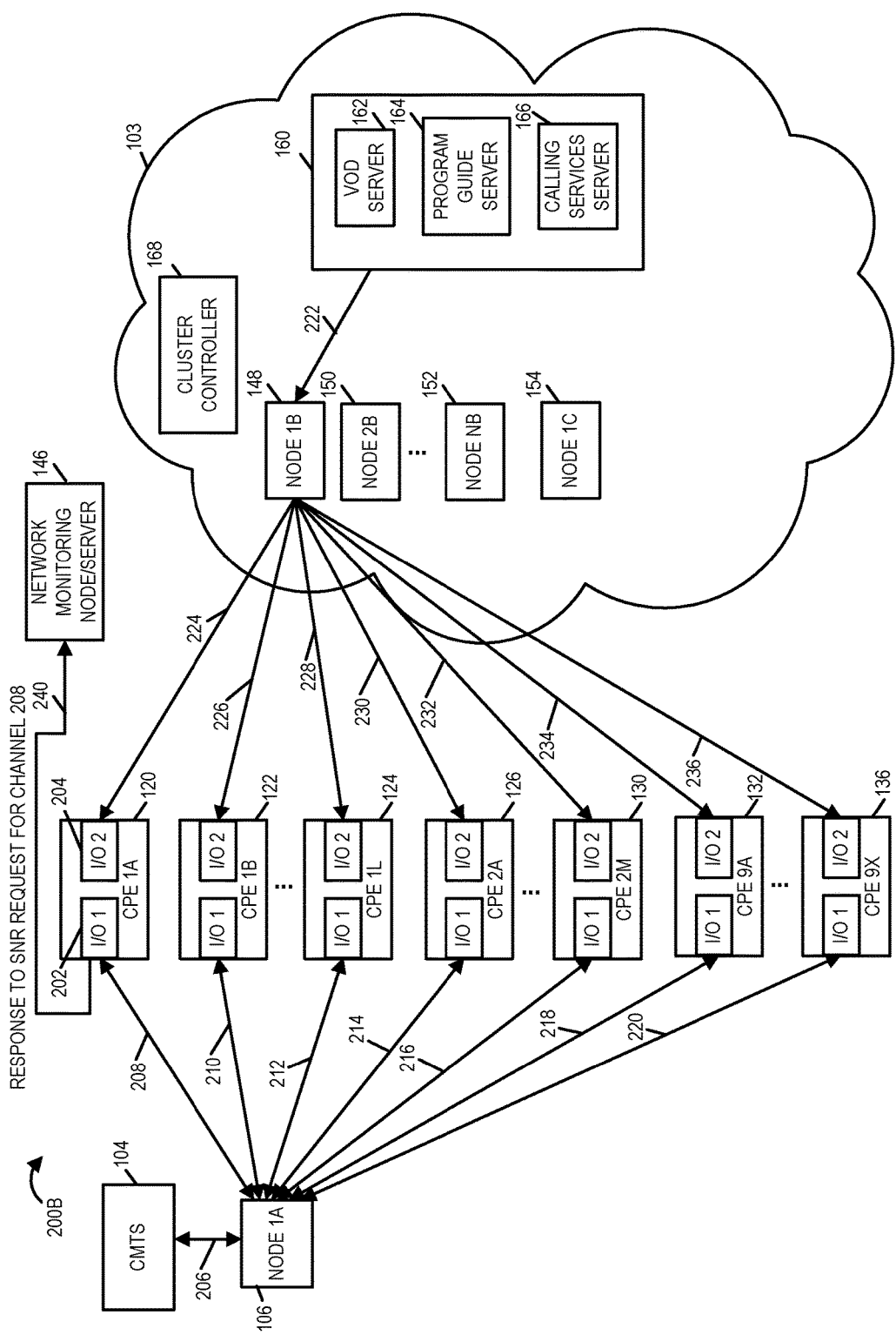
FIG. 2B illustrates various exemplary communications channels and signals used in one method embodiment of the present invention.

Signaling diagram 200B illustrated in FIG. 2B shows how the signal to noise ratio on the downlink channel 208A which has been generated by CPE 1A at the first time is transmitted to network monitoring node/server 146 in signal 240 which is a response message. While the signal is shown as being directly sent from the I/O 1 interface of CPE 1A 120, in some embodiments the signal will pass through the node 1A 106 and CMTS 104 as it travels to network monitoring node/server 146 from CPE 1A.

Figure 2C:
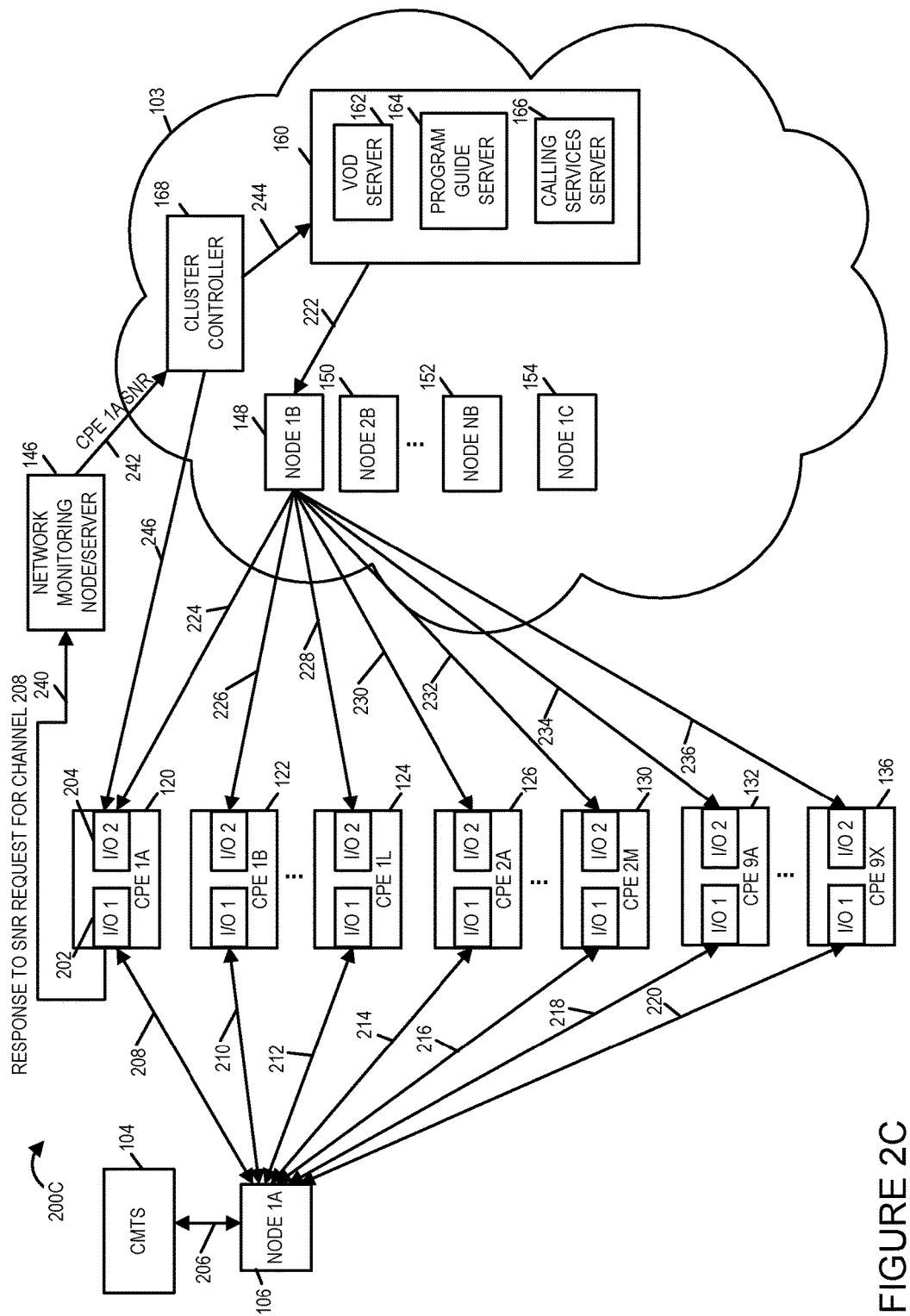
FIG. 2C illustrates various exemplary communications channels and signals used in one method embodiment of the present invention.

Signaling diagram 200C illustrated in FIG. 2C shows how the signal to noise ratio on the downlink channel 208A at the first time which was received by network monitoring node/server 146 from CPE 1A 120 is transmitted to cluster controller 168 via signal 242. Cluster controller 168 determines the SNR on the communication channel 208A based on the information contained in the received signal 242. Cluster controller 168 then makes a decision as to whether the SNR on the communication channel 208A is below a SNR threshold for determining QAM level to be used in providing cloud services to CPE 1A 120. In this example, the signal to noise ratio threshold is 35 dBmv and received SNR ratio at the first time for the communications channel 208A is 31 dBmv. As 31 dBmv SNR for the communication channel 208A is below the SNR threshold the cluster controller makes a decision to switch the cluster node which is providing services for CPE 1A 120 from cluster node 1B 148 which uses a 256 QAM level to a cluster node with a lower QAM level to avoid cloud service interruption resulting from a potential cloud session termination due to a potential increase in noise on the communications channel 224 between node 1B 148 and CPE 1A 120 I/O 2 Interface 204. By avoiding the interruption of the cloud services, the system will avoid customer complaints that relating to loss of cloud services such as for example, no guide information being available, no video on demand being available, teardown of currently active video on demand session, no caller identification displaying, and EPG data on cloud not displaying. The cluster controller 168 makes the decision to switch from cluster node 1B 148 to cluster node 1C 154 which uses a 64 QAM level to provide cloud services to customer premise devices it is supporting.

The cluster controller 168 transmits signal 246 to I/O 2 204 of CPE 1A which includes a message providing the IP address of node 1C 154 to which CPE 1A should now communicate in connection with receiving cloud services. In some embodiments, the signal 246 also includes the QAM level which will be used to provide cloud services to the CPE device. The cluster controller 168 also sends signal 244 to cloud services server 160 to instruct the cloud services server 160 to switch from sending cloud services information, data, and messages for CPE 1A 120 to cluster node 1B to sending cloud services information, data and messages for CPE 1A 120 to cluster node 1C 154 which will responsible to supporting delivery of cloud services to CPE 1A 120.

Figure 2D:
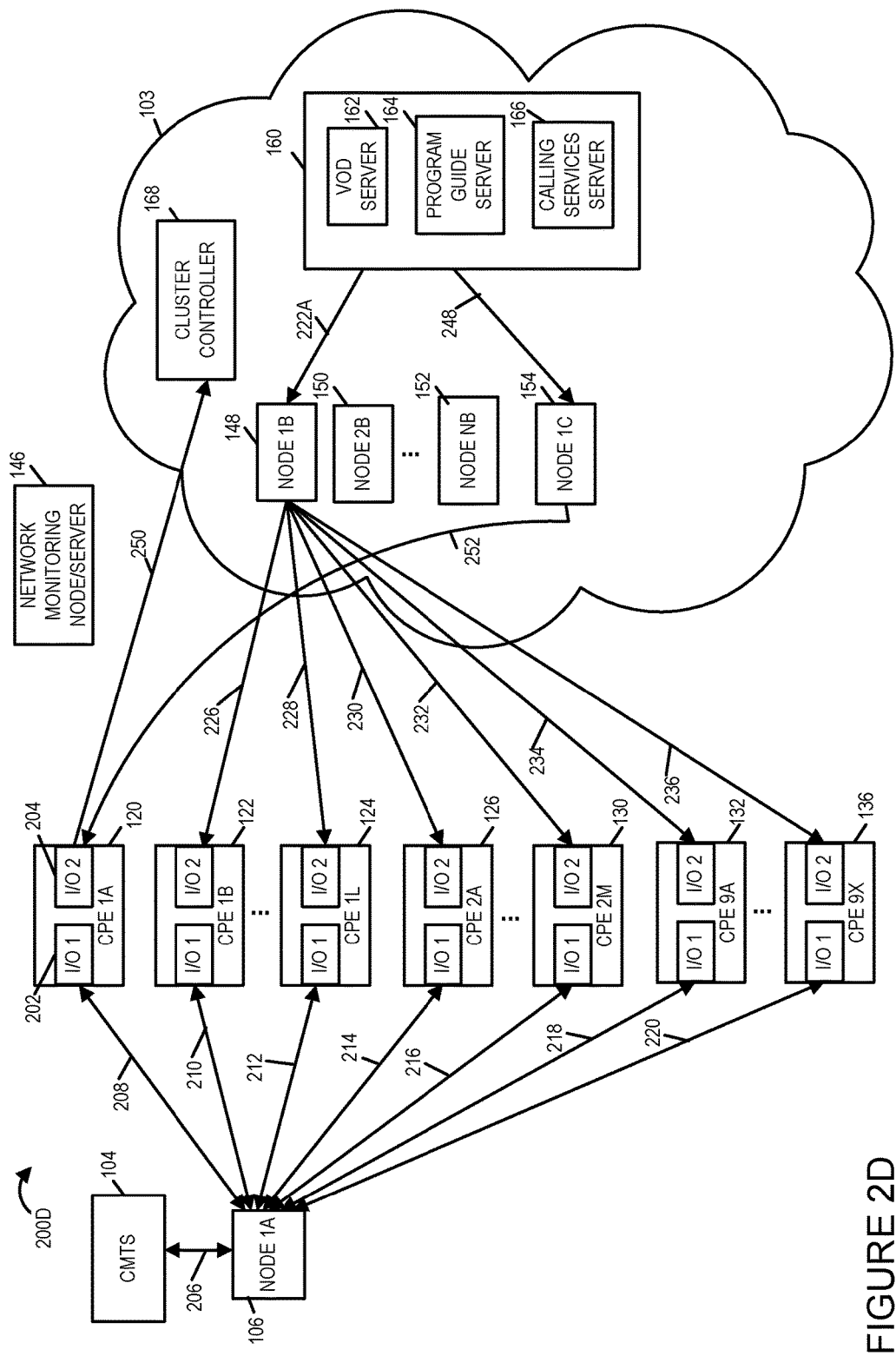
FIG. 2D illustrates various exemplary communications channels and signals used in one method embodiment of the present invention.

Signaling diagram 200D illustrated in FIG. 2D shows signal 250 being sent from I/O Interface 2 of CPE 1A 120 to cluster controller 168. The signal 250 acknowledges receipt of the signal 246 providing the IP address and in some cases the 64 QAM level to used to provide cloud services going forward. Signal 222A includes the data, information and messages for cloud services for CPE devices 122, . . . , 124, 126, . . . , 130, 132, . . . , 136 which node 1B is still supporting but does not include the data, information and messages for cloud services for CPE 1A 120 which it is no longer supporting. In some embodiments, the signal 222A also includes instructions that node 1B is no longer supporting delivery of cloud services to CPE 1A 120 and should release any resource reserved for supporting such services. In some embodiments, the cluster controller 168 sends a signal directly to the node 1B informing cluster node 1B that it is no longer supporting CPE 1A 120.

Signal 248 sent from cloud services server 160 to cluster node 1C 154 includes the data, information and messages for cloud services for CPE 1A 120. In some embodiments, the signal 248 also includes instructions that the node 1C 154 is to support cloud services delivery to CPE 1A 120 and provides the IP address for the I/O 2 Interface 204 to which cloud services data, information and messages are to be delivered. In some embodiments, the cluster controller 168 sends an instruction directly to the cluster node 1C 154 providing the IP address for the I/O 2 Interface 204 and instructing/assigning responsibility for providing cloud services to CPE 1A 120 to node 1C 154.

Cluster node 1C 154 transmits signal 252 to I/O 2 Interface 204 of the CPE 120 providing the cloud services information, data and messages received in signal 248 to CPE 1A 120. Cluster node 1C 154 provides the cloud service information, data, and messages using 64 QAM level.

Figure 2E:
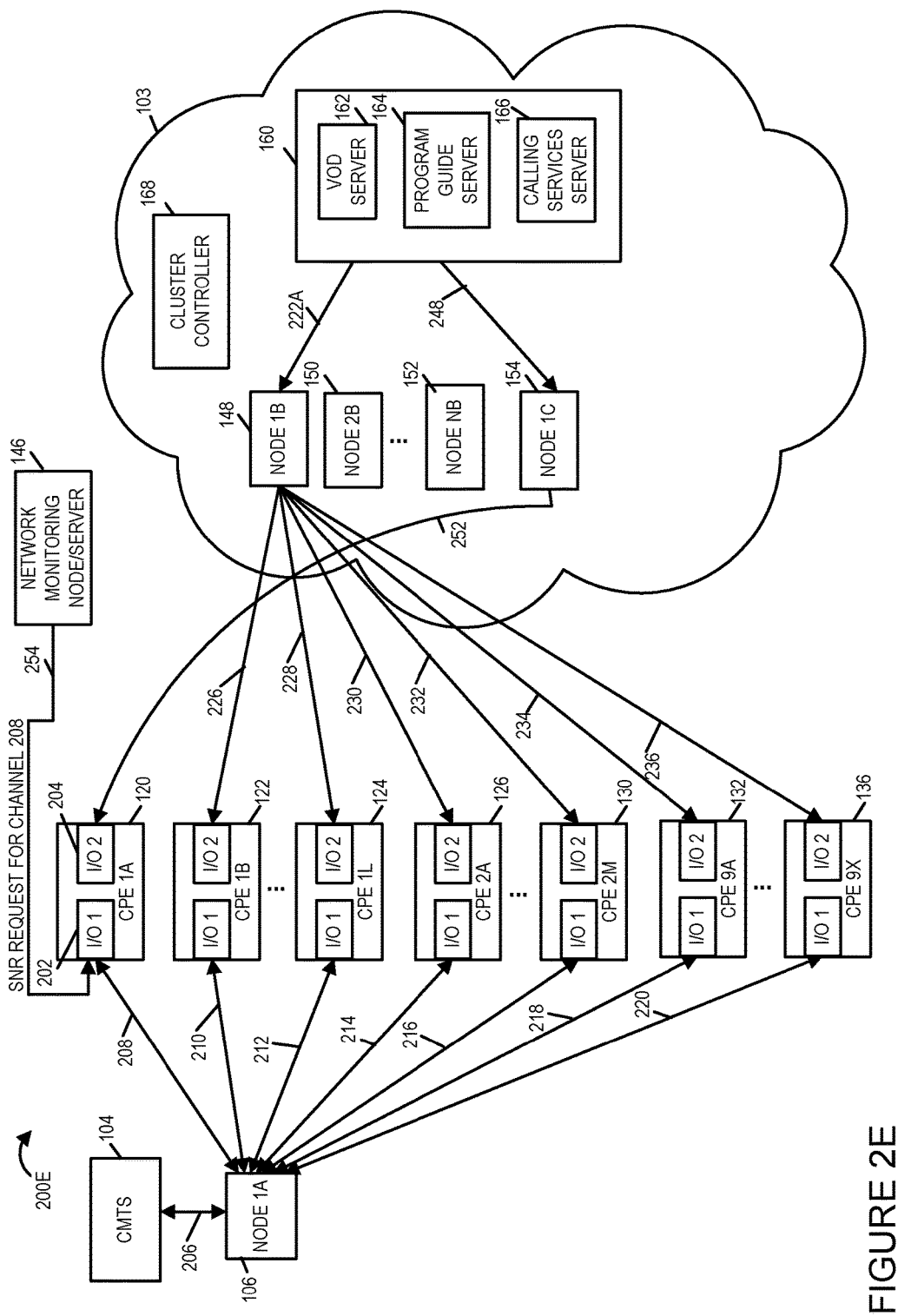
FIG. 2E illustrates various exemplary communications channels and signals used in one method embodiment of the present invention.

Signaling diagram 200E illustrated in FIG. 2E shows network monitoring node/server 146 at a second time send signal 254 to the first I/O 1 Interface 202 on CPE 1A 120. Signal 254 is a request for the signal to noise ratio on channel 208 and in particular for downlink channel 208A. The request may be, and in some embodiments is, a SNMP polling request that would not adversely affect the network as SNMP traffic is by default set to Best effort in the class of service parameter of the CMTS, so this would result in little network traffic load. It should be noted that while the signal is shown as being sent directly to the CPE 1A I/O 1 interface 202, the signal may, and in some embodiments does pass through CMTS 104 and node 1A 106. In some embodiments, the request from the network monitoring node/server 146 is a request sent to an application residing on CPE 1A 120. In response to receiving the request for SNR on downlink communications channel 208A, the CPE 1A 120 generates and/or determines the SNR for communications channel 208A at the second time. In some embodiments, the CPE 1A 120 may already have generated the requested SNR for communications channel 208A and may in such cases not generate a new SNR if the previously generated SNR is not considered stale.

Figure 2F:
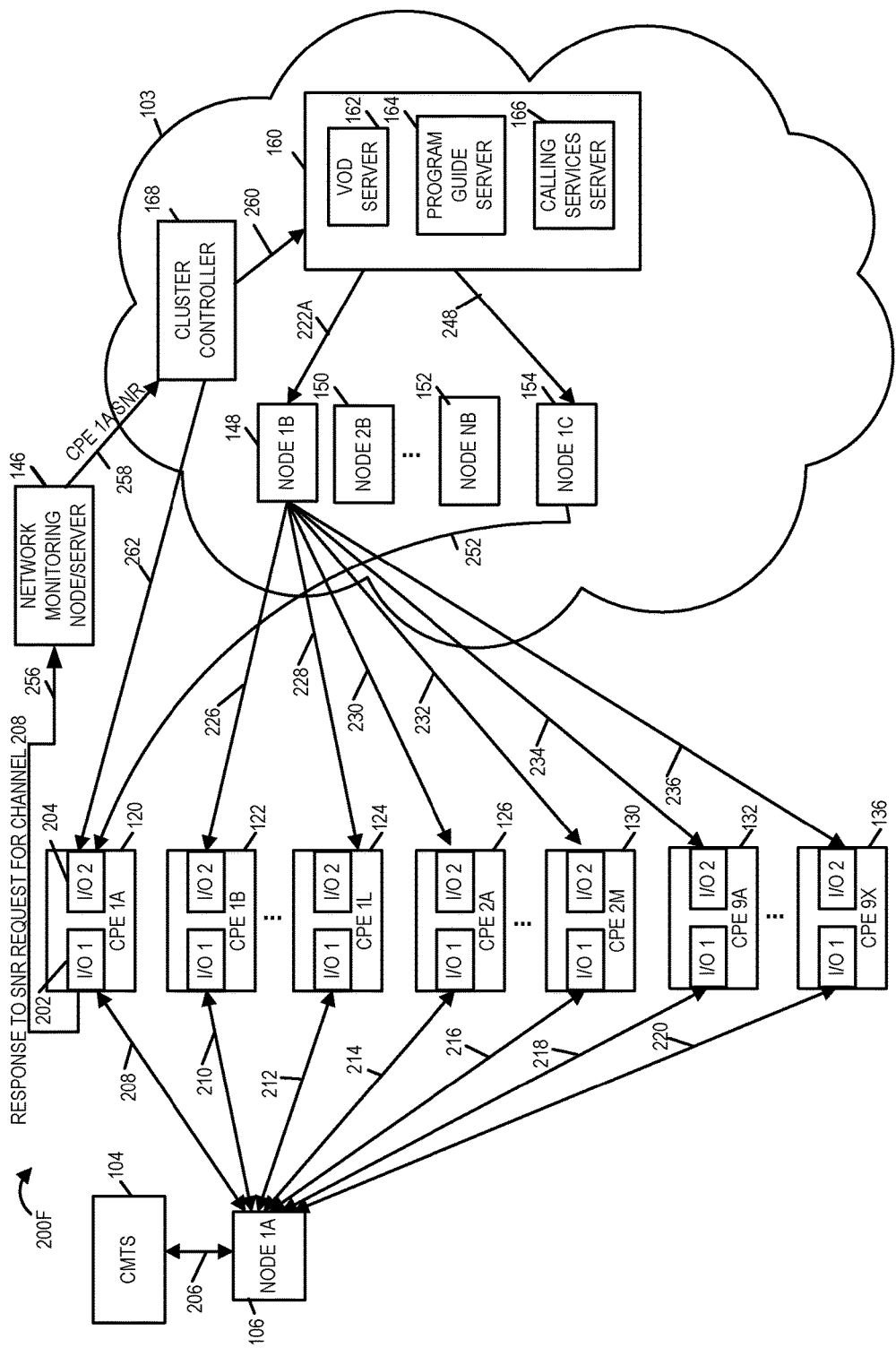
FIG. 2F illustrates various exemplary communications channels and signals used in one method embodiment of the present invention.

Signaling diagram 200F illustrated in FIG. 2F shows how the signal to noise ratio on the downlink channel 208A which has been generated by CPE 1A 120 at the second time is transmitted to network monitoring node/server 146 in signal 256 which is a response message. While the signal is shown as being directly sent from the I/O 1 interface of CPE 1A 120, in some embodiments the signal will pass through the node 1A 106 and CMTS 104 as it travels to network monitoring node/server 146 from CPE 1A.

Signaling diagram 200F also shows how the signal to noise ratio on the downlink channel 208A at the second time which was received by network monitoring node/server 146 from CPE 1A 120 is transmitted to cluster controller 168 via signal 258. Cluster controller 168 determines the SNR on the communication channel 208A based on the information contained in the received signal 258. Cluster controller 168 then makes a decision as to whether the SNR on the communication channel 208A is below a SNR threshold for determining QAM level to be used in providing cloud services to CPE 1A 120. As previously discussed, in this example, the signal to noise ratio threshold is 35 dBmv. The received and/or determined SNR ratio at the second time for the communications channel 208A is 36 dBmv. As 35 dBmv SNR for the communication channel 208A is above the SNR threshold the cluster controller makes a decision to switch the cluster node which is providing services for CPE 1A 120 from cluster node 1C 154 which uses a 64 QAM level to a cluster node with a higher QAM level to provide the better quality cloud service to the CPE 1A device now that a determination has been made that the SNR is at a level that can sustain the higher QAM level with a lower risk of potential interruption to use poor SNR on the communications channel 252 between node 1C 154 and CPE 1A 120 I/O 2 Interface 204. In this example, the cluster controller 168 selects cluster node 2B 150 which uses a 256 QAM level to provide cloud services to customer premises equipment devices.

The cluster controller 168 transmits signal 262 to I/O 2 204 of CPE 1A 120 which includes a message providing the IP address of node 1B 150 to which CPE 1A should now communicate in connection with receiving cloud services. In some embodiments, the signal 262 also includes the QAM level which will be used to provide cloud services to the CPE device. The cluster controller 168 also sends signal 260 to cloud services server 160 to instruct the cloud services server 160 to switch from sending cloud services information, data, and messages for CPE 1A 120 to cluster node 1C 154 to sending cloud services information, data and messages for CPE 1A 120 to cluster node 2B 150 which will now be responsible to supporting delivery of cloud services to CPE 1A 120.

Figure 2G:
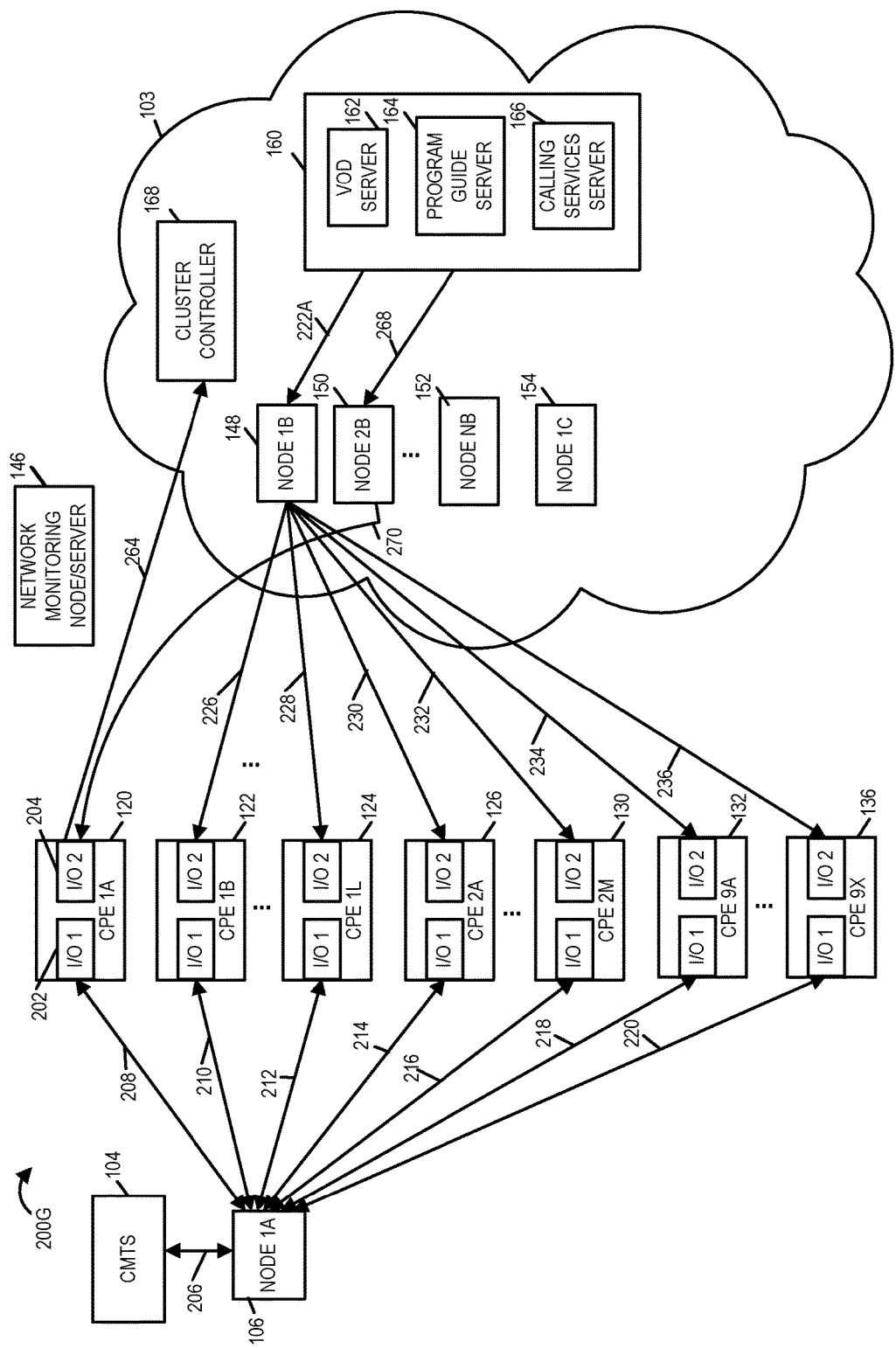
FIG. 2G illustrates various exemplary communications channels and signals used in one method embodiment of the present invention.

Signaling diagram 200G illustrated in FIG. 2G shows signal 264 being sent from I/O Interface 2 of CPE 1A 120 to cluster controller 168. The signal 264 acknowledges receipt of the signal 262 providing the IP address and in some cases the 256 QAM level to used to provide cloud services going forward. Signal 222A includes the data, information and messages for cloud services for CPE devices 122, . . . , 124, 126, . . . , 130, 132, . . . , 136 which cluster node 1B is still supporting. Signal 248 is not shown as cloud services data for CPE 1A 120 is no longer to be via node 1C 154. The cloud services server 160 will information node 1C 154 that it is no longer supporting CPE 1A 120 cloud services. In some embodiments, the cluster controller 168 sends a signal directly to the node 1C 154 informing cluster node 1C that it is no longer supporting CPE 1A 120. Signal 268 between cloud services server 160 and node 2B 150 includes the data, information and messages for cloud services for CPE 1A 120.

In some embodiments, the signal 268 also includes instructions that the node 2B 150 is to support cloud services delivery to CPE 1A 120 and provides the IP address for the I/O 2 Interface 204 to which cloud services data, information and messages are to be delivered. In some embodiments, the cluster controller 168 sends an instruction directly to the cluster node 2B 150 providing the IP address for the I/O 2 Interface 204 and instructing/assigning responsibility for providing cloud services to CPE 1A 120 to node 2B 150.

Cluster node 2B 150 transmits signal 270 to I/O 2 Interface 204 of the CPE 120 providing the cloud services information, data and messages received in signal 268 to CPE 1A 120. Cluster node 2B 150 provides the cloud service information, data, and messages using 256 QAM level.

In the example described in connection with FIGS. 2, 2A, 2B, 2C, 2D, 2E, 2F, and 2G, a single signal to noise ratio threshold of 35 dBmv was used. In some embodiments, to avoid frequent switching between nodes a first and second signal to noise thresholds. For example, if the signal to noise ratio is below a first SNR threshold of 32 dBmv then when the current node is using a 256 QAM level switch to a node with a lower QAM level (e.g., 128 QAM or 64 QAM). If the signal to noise ratio is above a second SNR threshold of 35 dBm and the current cluster node uses a QAM level below 256 QAM level then switch to a node with a higher QAM level that supports 256 QAM level. This avoids switching the SNR fluctuates above and belong a single SNR threshold level. To avoid frequent switching, two different SNR thresholds may be used for each QAM level supported to determine whether to use a higher or lower QAM level node.

FIGS. 2, 2A, 2B, 2C, 2D, 2E, 2F, and 2G have illustrated exemplary signaling that may be used to implement one embodiment of the present invention in which QAM levels are dynamically changed based on SNR ratios of communications channels so as to reduce cloud service interruptions to a customer operating a CPE 1A device and thereby provide the customer a better experience than one in which cloud service interruptions occur due to changes in SNR communication channel levels.

Figure 6A:
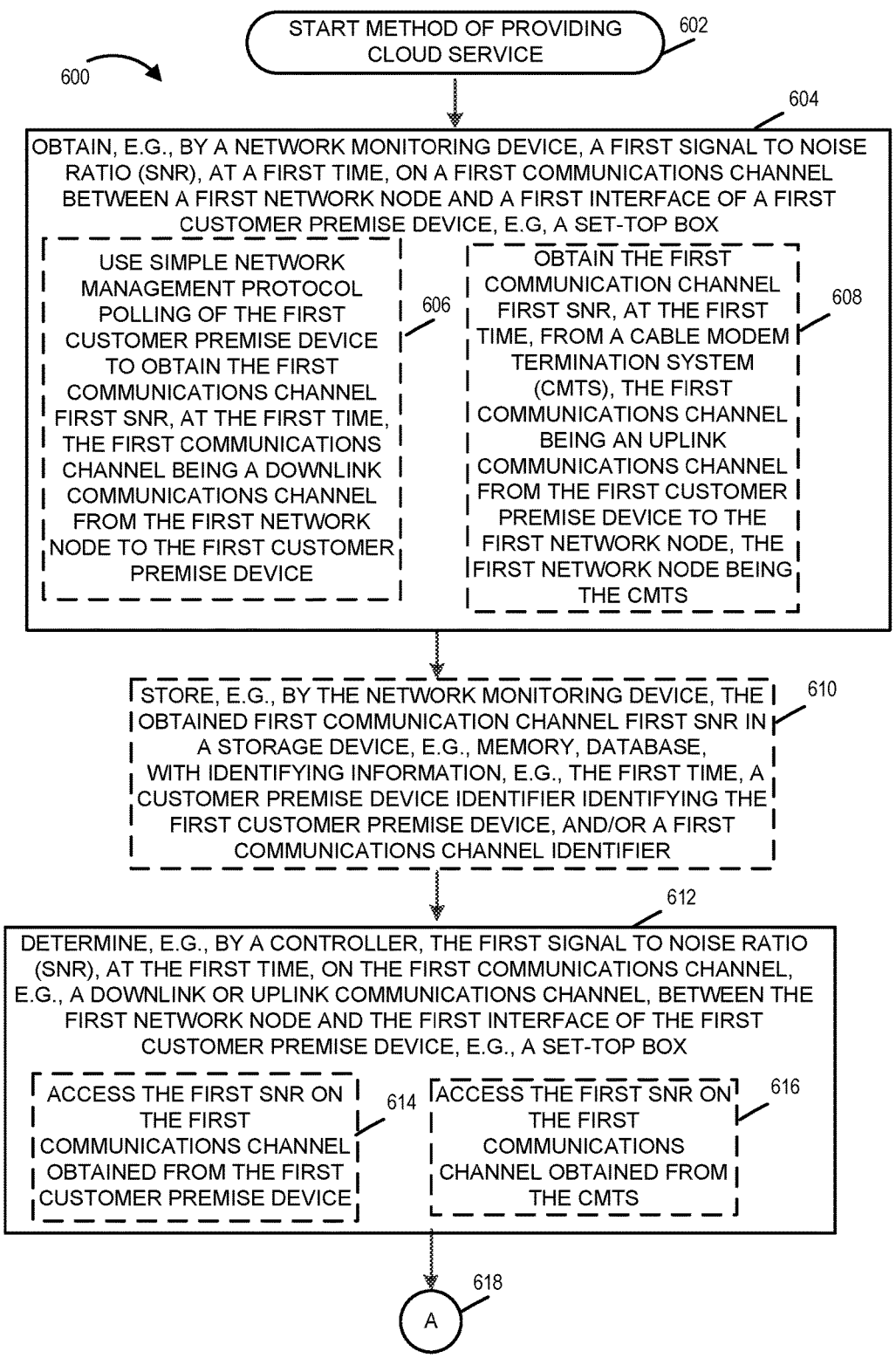
FIG. 6A illustrates the steps of the first part of an exemplary method for providing cloud based services in accordance with one embodiment of the present invention.
Figure 6B:
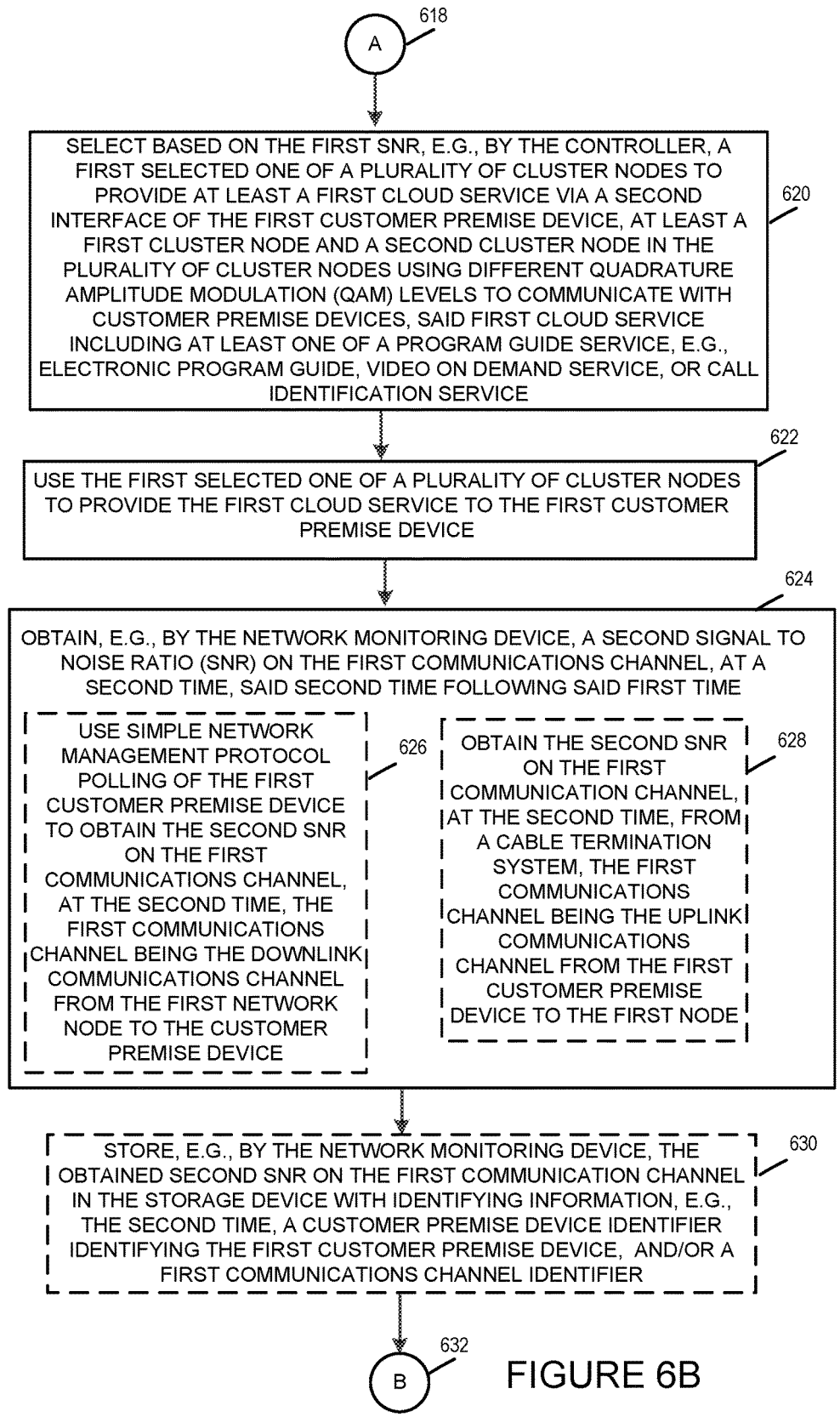
FIG. 6B illustrates the steps of the second part of an exemplary method for providing cloud based services in accordance with one embodiment of the present invention.
Figure 6C:
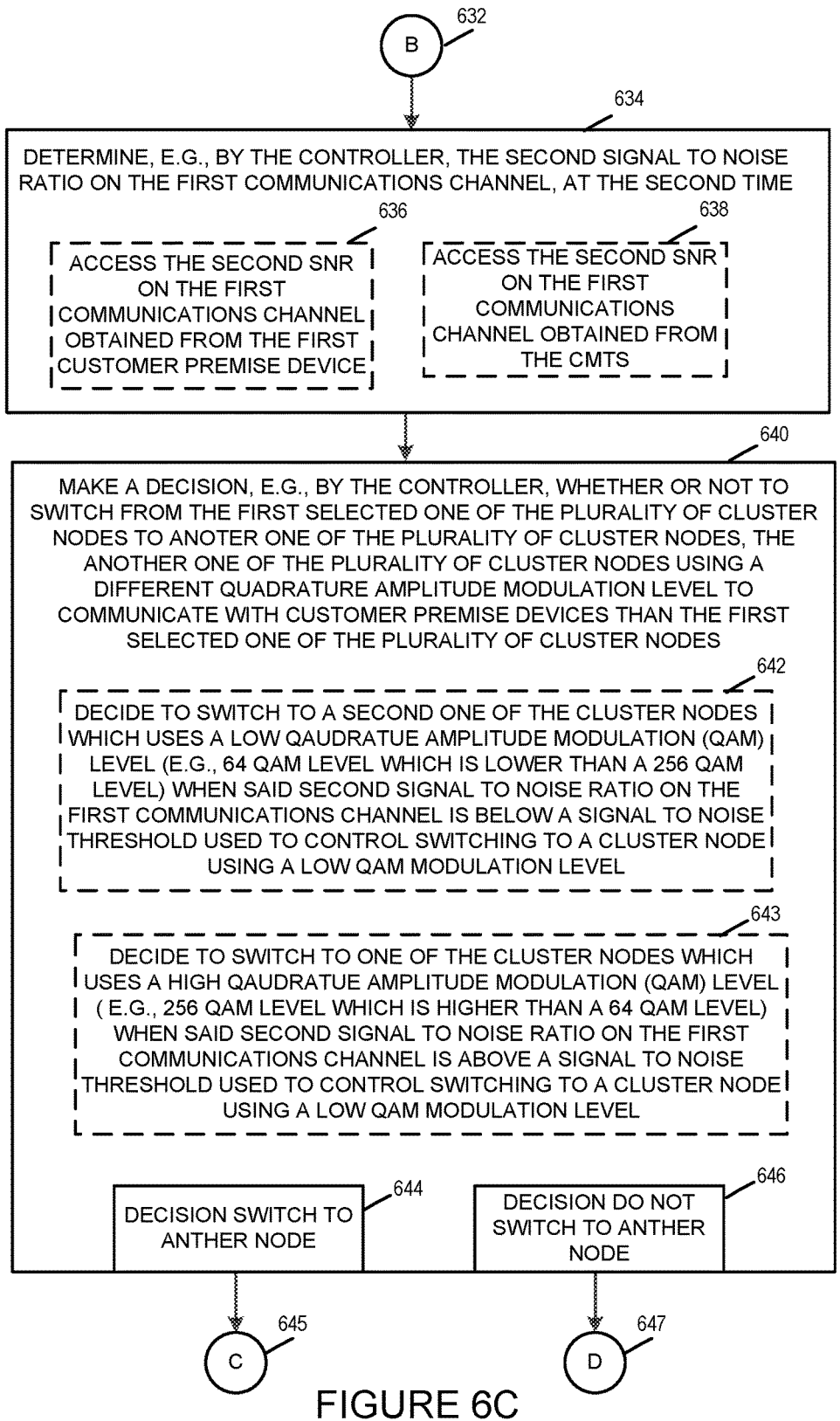
FIG. 6C illustrates the steps of the third part of an exemplary method for providing cloud based services in accordance with one embodiment of the present invention.
Figures 6, 6A, 6B, 6C, 6D:
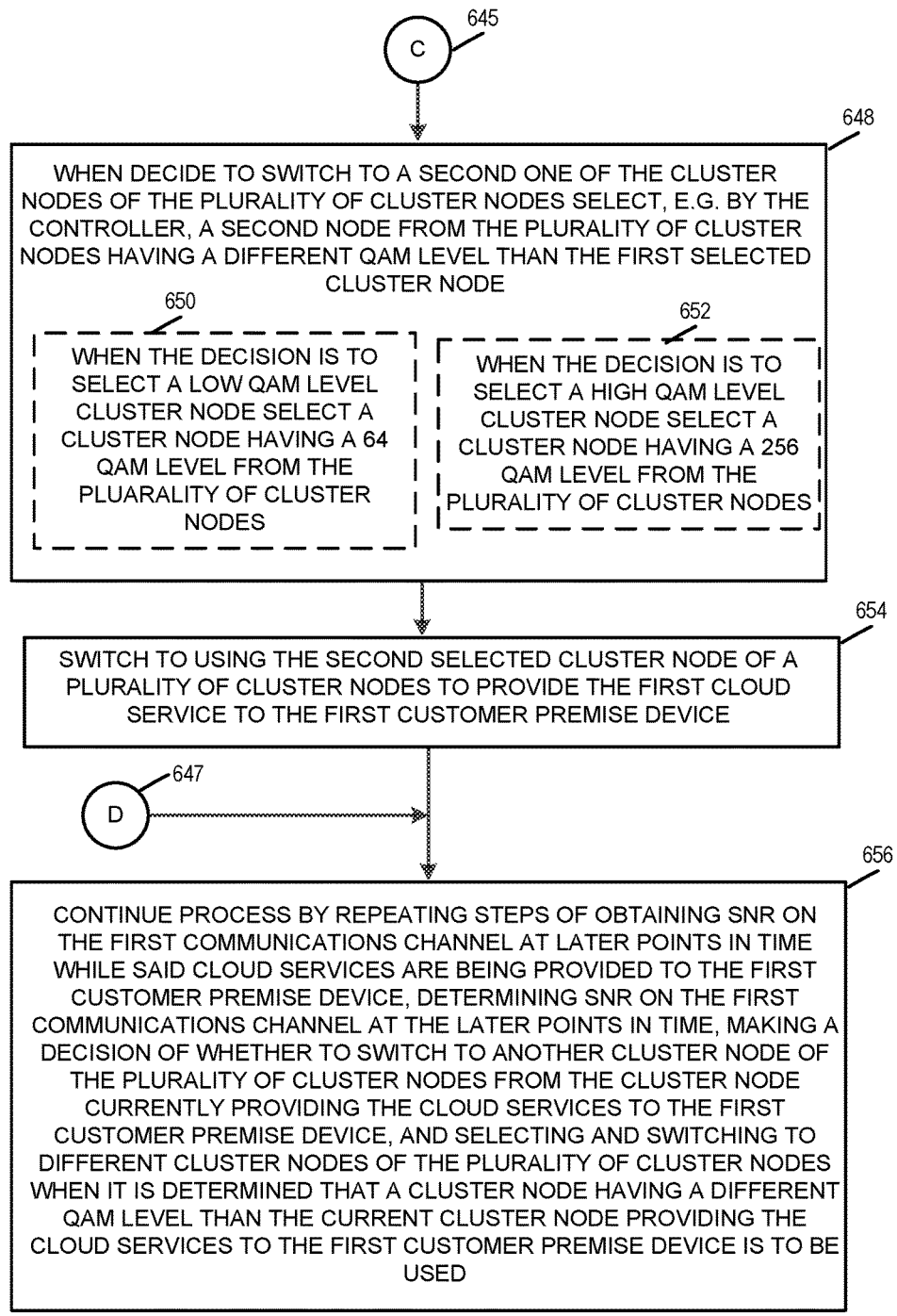
FIG. 6 illustrates the combination of FIGS. 6A, 6B, 6C, and 6D.
FIG. 6D illustrates the steps of the fourth part of an exemplary method for providing cloud based services in accordance with one embodiment of the present invention.

FIG. 6, which comprises the combination of FIGS. 6A, 6B, 6C, and 6D illustrates an exemplary method 600 of providing cloud services to at least a first customer premise device, e.g., a set-top box, in accordance with an embodiment of the invention. FIG. 6A illustrates the steps of the first part of an exemplary method for providing cloud based services in accordance with one embodiment of the present invention. FIG. 6B illustrates the steps of the second part of an exemplary method for providing cloud based services in accordance with one embodiment of the present invention.

FIG. 6C illustrates the steps of the third part of an exemplary method for providing cloud based services in accordance with one embodiment of the present invention. FIG. 6D illustrates the steps of the fourth part of an exemplary method for providing cloud based services in accordance with one embodiment of the present invention.

For explanatory purposes the exemplary method 600 will be explained in connection with the exemplary system 100 illustrated in FIG. 1 although it should be understand that the method may be implemented using other systems and other system configurations then those illustrated in FIG. 1.

The method 600 shown in FIG. 6 will now be discussed in detail. In connection with the discussion of the method 600. The method starts in start step 602 shown on FIG. 6A with the devices in system 100 being initialized and becoming operational. Communications channels are established between a first customer premise device, e.g., CPE 1A 120 which may be a set-top box, and a CMTS, e.g., CMTS 104, via a first network node 1A 106. Communications channels are also established to provide cloud services between the first customer premise device and the cloud network 103. The CPE 1A 120 is implemented in accordance with the customer premise device 400 as illustrated and described in connection with FIG. 4. Operation proceeds from step 602 to step 604.

In step 604, a first signal to noise ratio (SNR) is obtained at a first time, on a first communications channel between the first network node (node 1A 106) and a first interface of the first customer premise device (I/O Interface 1 202). In some embodiments, step 604 is performed by the network monitoring device 146.

In some embodiments, step 604 includes optional sub-step 606 or 608. In optional sub-step 606 Simple Network Management Protocol polling is used to obtain the first signal to noise ratio on the first communications channel signal at the first time. The first communications channel in such embodiments is the downlink or downstream communications channel from the first network node to the first customer premise device. In some embodiments, the first customer premise device generates the signal to noise ratio on the first communications channel and responds to a poll request, e.g., from the network monitoring node/server 146, providing the generated first signal to noise ratio on the first communications channel to the requesting entity.

In optional sub-step 608, the first signal to noise ratio on the first communications channel is obtained, at the first time, from a cable modem termination system (CMTS 106). The first communications channel in such embodiments being an uplink or upstream communications channel from the first interface of the first customer premise device (e.g., I/O Interface 202 on CPE 1A 120) to the first network node (node 1A 106), the first network node being the cable modem termination system from which the first signal to noise ratio is obtained. In some such embodiments, the CMTS generates the first signal to noise ratio on the first channel at the first time.

Operation proceeds from step 604 to optional step 610. If step 610 is not implemented than operation proceeds from step 610 to step 612. In step 610, the obtained first communication channel first signal to noise ratio is stored in a storage device, e.g., memory or a database. Step 610 may be performed by network monitoring node/server 146 with the storage device being either internal or external to the network monitoring node/server 146. In some embodiments, the first SNR level is stored in memory in the cluster controller. In some embodiments, the first communication channel first signal to noise ratio is stored in the storage device with identifying information such as for example, the first time, a customer premise device identifier identifying the first customer premise device to which the first SNR corresponds and/or a first communications channel identifier to which the first SNR corresponds. In some embodiments, the information is stored in a communications channel record, a customer premise equipment record, and/or a network management record. In at least some embodiments, the storage device and the stored first communications channel first SNR data is either directly accessible or accessible via a request from one or more devices in the system 100, e.g., the cluster controller 168. Operation proceeds from step 610 to step 612.

In step 612, the first signal to noise ratio, at the first time, on the first communications channel, between the first network node and the first interface of the customer premise device is determined. In most, but not all, embodiments, step 612 is performed by a controller for example cluster controller 168 illustrated in FIG. 1. In some embodiments, step 612 includes sub-step 614 or sub-step 616.

In sub-step 614, determining the first SNR on the first communications channel includes accessing the first SNR on the first communications channel obtained from the first customer premise device. The first communications channel is typically the downlink communications channel from the first network node to the first customer premise device in such instances.

In sub-step 616, determining the first SNR on the first communications channel includes accessing the first SNR on the first communications channel which was obtained from the CMTS. The first communications channel is typically the uplink communications channel from the first customer premise device to the first network node, the first network node being the CMTS in such instances.

In some embodiments, sub-steps 614 and 616 include accessing the storage device and, in some instances, the record within the storage device in which the first SNR on the first communication channel and associated data was stored.

Operation proceeds from step 612 via connection node A 618 to step 620 shown on FIG. 6B.

In step 620, a first selected one of a plurality of cluster nodes is selected based on the determined first SNR to provide at least a first cloud service over a second communications channel via a second interface of the customer premise device, e.g., second Interface I/O 2 204 of CPE 1A 120. The plurality of cluster nodes including at least a first cluster node (e.g., cluster node 1B 148 using a 256 QAM level to communicate with customer premises devices) and a second cluster node (e.g., cluster node 1C 154 using 64 QAM level to communicate with customer premises devices) using different Quadrature Amplitude Modulation (QAM) levels to communicate with customer premise devices. The first cloud service including at least one of a program guide service, e.g., Electronic Program Guide (EPG) service, Video On-Demand (VOD) service, or call identification (Caller ID) service. For explanatory purposes assume that the first determined first SNR is 45 dBmv. The based on the SNR level the controller then selects a cluster node that uses a high QAM level to delivery cloud services to the first customer premise device. In this case the cluster controller selects node 1B 146 which uses a 256 QAM level (that is a high QAM level) to communicate with customer premise devices. Now let us assume that the determined first SNR is 30 dBmv. Based on the determined first SNR of 30 dBmv, the cluster controller selects a cluster node (e.g., node 1C 154) that uses a 64 QAM level (that is a low QAM level)

to communicate with customer premises devices. The use of the 64 QAM level cluster node provides a slightly degraded service as opposed to the 256 QAM level but it reduces, mitigates and/or eliminates the potential interruption of cloud service and/or the spontaneous resetting of the first customer premise device for example resulting from high noise on the second communications channel. Operation proceeds from step 620 to step 622.

In step 622, the first selected one of a plurality of cluster nodes (e.g., cluster node 1B 146 which communicates information, data, and commands to customer premise devices using a 256 QAM level or cluster node 1C 154 which communications information, data, and commands to customer premise devices using a 64 QAM level) is used to provide the first cloud service to the first customer premise device. Providing the first cloud service including communicating information, data and commands to the first customer premise device over the second communications channel from the selected cluster node to the second interface of the first customer premise device. As part of providing cloud services to the first customer premise device, the IP address of the cluster node which will be providing the cloud services will be provided to the first customer premise device and in some instances the QAM level that will be used in providing the cloud services. Operation proceeds from step 622 to step 624.

In step 624, a second signal to noise ratio (SNR) on the first communications channel between the first network node (node 1A 106) is obtained at a second time. The second time following the first time. In some embodiments, step 624 is performed by the network monitoring device 146.

In some embodiments, step 624 includes optional sub-step 626 or 628. In optional sub-step 626 Simple Network Management Protocol polling is used to obtain the second signal to noise ratio on the first communications channel signal at the second time. The first communications channel in such embodiments is the downlink or downstream communications channel from the first network node to the first customer premise device. In some embodiments, the first customer premise device generates the signal to noise ratio on the first communications channel and responds to a poll request, e.g., from the network monitoring node/server 146, providing the generated second signal to noise ratio on the first communications channel to the requesting entity.

In optional sub-step 628, the first signal to noise ratio on the first communications channel is obtained, at the second time, from a cable modem termination system (CMTS 106). The first communications channel in such embodiments being an uplink or upstream communications channel from the first interface of the first customer premise device (e.g., I/O Interface 202 on CPE 1A 120) to the first network node (node 1A 106), the first network node being the cable modem termination system from which the second signal to noise ratio is obtained. In some such embodiments, the CMTS generates the first signal to noise ratio on the first channel at the first time.

Operation proceeds from step 624 to optional step 630. If step 630 is not implemented than operation proceeds from step 624 to step 634 shown on FIG. 6C via connection node B 632. In step 610, the obtained first communication channel second signal to noise ratio is stored in a storage device, e.g., memory or a database. Step 630 may be performed by network monitoring node/server 146 with the storage device being either internal or external to the network monitoring node/server 146. In some embodiments, the second SNR level is stored in memory in the cluster controller 168. In some embodiments, the first communication channel second signal to noise ratio is stored in the storage device with identifying information such as for example, the second time, a customer premise device identifier identifying the first customer premise device to which the second SNR corresponds and/or a first communications channel identifier to which the first SNR corresponds. In some embodiments, the information is stored in a communications channel record, a customer premise equipment record, and/or a network management record. In at least some embodiments, the storage device and the stored first communications channel second SNR data is either directly accessible or accessible via a request from one or more devices in the system 100, e.g., the cluster controller 168. Operation proceeds from step 630 to step 634 shown on FIG. 6C via connection node B 132.

In step 634, the second signal to noise ratio, at the second time, on the first communications channel, between the first network node and the first interface of the customer premise device is determined. In most, but not all, embodiments, step 634 is performed by a controller for example cluster controller 168 illustrated in FIG. 1. In some embodiments, step 634 includes sub-step 636 or sub-step 638.

In sub-step 636, determining the second SNR on the first communications channel includes accessing the second SNR on the first communications channel obtained from the first customer premise device. The first communications channel is typically the downlink communications channel from the first network node to the first customer premise device in such instances.

In sub-step 638, determining the second SNR on the first communications channel includes accessing the second SNR on the first communications channel which was obtained from the CMTS. The first communications channel is typically the uplink communications channel from the first customer premise device to the first network node, the first network node being the CMTS in such instances.

In some embodiments, sub-steps 636 and 638 include accessing the storage device and, in some instances, the record within the storage device in which the second SNR on the first communication channel and associated data was stored.

Operation proceeds from step 634 to step 640.

In step 640, a decision is made as whether or not to switch from the first selected one of the plurality of cluster nodes to another one of the plurality of cluster nodes, the another one of the plurality of cluster nodes using a different quadrature amplitude modulation level to communicate with customer premise devices than the first selected one of the plurality of cluster nodes. Step 640 is typically performed by a controller for example cluster controller 168. In some embodiments, step 640 includes sub-steps 642 and 643.

In sub-step 642, a decision is made to switch to a second one of the cluster nodes which uses a low QAM level (e.g., 64 QAM level) when said second signal to noise ratio on the first communications channel is below a first signal to noise threshold used to control switching to a cluster node using a low QAM modulation level.

In sub-step 643, a decision is made to switch to one of the cluster nodes (e.g., a second one of the plurality of cluster nodes) which uses a high QAM level (e.g., a 256 QAM level which is higher than a 64 QAM level used by the cluster node which uses a low QAM level to communicate to customer premise devices) when said second signal to noise ratio on the first communications channel is above a second signal to noise threshold used to control switching to a cluster node using a high QAM modulation level. While the first and second signal to noise thresholds may be and are the same in some embodiments, in most embodiments, the first and second signal to noise thresholds are different so as to avoid frequent switching between cluster nodes.

Operation proceeds from step 640 sub-step 644 to step 648 shown on FIG. 6D via connection node C 645 when a decision is made to make a switch from the first selected one of the plurality of cluster nodes to another one of the plurality of cluster nodes. Operation proceeds from step 640 sub-step 646 via connection node D 647 to step 656 shown on FIG. 6D when the decision made is not to switch to another node.

In step 648, when a decision is made to two switch to a second one of the cluster nodes of the plurality of cluster nodes a selection is made, for example by the cluster controller 168, of a second node from the plurality of cluster nodes having a different QAM level than the first selected cluster node. In some embodiments, step 648 includes sub-steps 650 and 652.

In sub-step 650, when the decision is made to select a low QAM level cluster node, a cluster node having a 64 QAM level is selected from the plurality of cluster nodes.

In sub-step 652, when the decision is made to select a high QAM level cluster node, a cluster node having a 256 QAM level is selected from the plurality of cluster nodes.

Operation proceeds from step 648 to step 654. In step 654, the system 100 switches to using the second selected cluster node of a plurality of cluster nodes to provide the first cloud service to the first customer premise device. The controller, e.g., cluster controller 168, controls the cluster nodes and performs the switch after which the second node provides the first selected cloud service to the first customer premise device. As part of performing the switch to using the second selected cluster node the first customer premise device is sent a message indicating the IP address of the second cluster node to be used in connection with requesting and receiving cloud services and in some instances the identification of the new QAM level at which the new QAM services are to be provided. Operation proceeds from step 654 to step 656.

In step 656, the process continues by repeating the steps of obtaining SNR on the first communications channel at later points in time while said cloud services are being provided to the first customer premise device, determining SNR on the first communications channel at the later points in time, making a decision of whether to switch to another cluster node of the plurality of cluster nodes from the cluster node currently providing the cloud services to the first customer premise device, and selecting and switching to different cluster nodes of the plurality of cluster nodes when it is determined that a cluster node having a different QAM level than the current cluster node providing the cloud services to the first customer premise device is to be used.

In at least some embodiments of the method 600, the first and second communications channels share a physical link for at least a portion of said first and second communications channels. In some such embodiments, the shared physical link is a communications link, e.g., cable wire, which terminates at a device within a customer premise in which the first customer premise device is located. In some embodiments, said device at which the communications link terminates is the first customer premise device.

By way of further explanation below is a summary of an implementation of a method in accordance with an embodiment of the invention. Assume that the method starts off with the first customer premise device being a set-top box (STB) receiving cloud services on a second communications channel from a cluster node at a high, e.g., 256, QAM level and then switches to using a lower, e.g., 64, QAM level in response to detecting a low SNR on the first communications channel based on the SNR on a first communications channel between the STB and a first network node. The STB can then switch back to the higher QAM cluster node if the SNR on the first communications channel improves to a predetermined level or threshold. A message from the cluster controller to the STB instructs which IP address the STB is to use to communicate with the cluster node and thus which cluster node will be used at a given time. The first communications channel is from a first interface on the STB to a first network node which is typically located in a cable headend or hubsite. In some embodiments the first network node is Cable Modem Terminal System (CMTS). The second communications channel is used to provide cloud services to the STB box and is from the a node in the cluster in the cloud. The network nodes being different than the cluster nodes providing the cloud service. The monitored first communications channel maybe, and sometimes is, a downlink channel which is monitored by polling of the individual STB to determine the SNR on the first communications channel. In other embodiments the first communications channel is an uplink channel between the STB and CMTS and the monitoring is done by polling the CMTS for the SNR on the uplink channel. While the second communications channel is different from the first communications channel they are not completely independent since a portion of the physical communications path of each of the first and second communications channels may be shared, e.g., the cable into the customer premise may be shared by the first and second communications channels which may and often do use different communications frequencies and/or different interfaces at the customer premise device. To avoid frequent switching a delay may be required between switches between the cluster nodes with the determination of SNR and selection of which cluster node and thus QAM level to use occurring in some embodiments on a periodic basis.

The implementation of the various embodiments of the invention, address the problem of customer complaints due to cloud service interruptions and customer premise devices spontaneously resetting due to increased noise on the communication channel between the cloud cluster node providing service and the customer premise device. While the SNR on the communication channel between the cloud cluster node and the customer premise device is not directly monitored, the SNR can be estimated by determining the SNR on a communications channel between the customer premise device and a first network node in the headend or hubsite providing cable modem services to the customer premise device. This is so as both communications channels share at least a portion of a communications link. This is achieved by monitoring/determining the SNR on a first communications channel and in response to the determined SNR on the first communications channel adjusting the QAM level used to provide the cloud services to the CPE device. In this way, as the noise increases or decreases on the second communications channel from the cloud cluster node providing the cloud services to the CPE device as inferred from the monitored/determined SNR on the first communications channel, different cloud cluster nodes having different QAM levels are selected to provide cloud services to the CPE device. This is most advantageous when the SNR for the uplink or downlink channels between the cloud nodes and the CPE device cannot be monitored or determined by the controller responsible for selecting the cluster node to provide cloud services to the CPE device. When the cloud cluster production nodes only support one QAM level to adjust the QAM level a different cluster node using a different QAM level then currently being used is selected to provide services to the CPE device. The newly selected cluster node uses a communications channel different from the first communications channel to provide the cloud services to the CPE device but the communication channel will share a common physical link with the first communications channel.

In some embodiments, there are a plurality of cluster nodes supporting different QAM levels (e.g., first cluster node using 256 QAM level, second cluster node using 128 QAM level, third cluster node using 64 QAM, fourth cluster node supporting 32 QAM level, fifth cluster node supporting 16 QAM level) and the cluster controller selects which cluster node to use to provide services to the CPE device from among the different cluster nodes using different QAM levels based on the SNR determined on the first communications channel between the first network node in the headend or hubsite and the CPE device. The first communications channel being different then the communications channel used to provide the cloud services.

Figure 7:
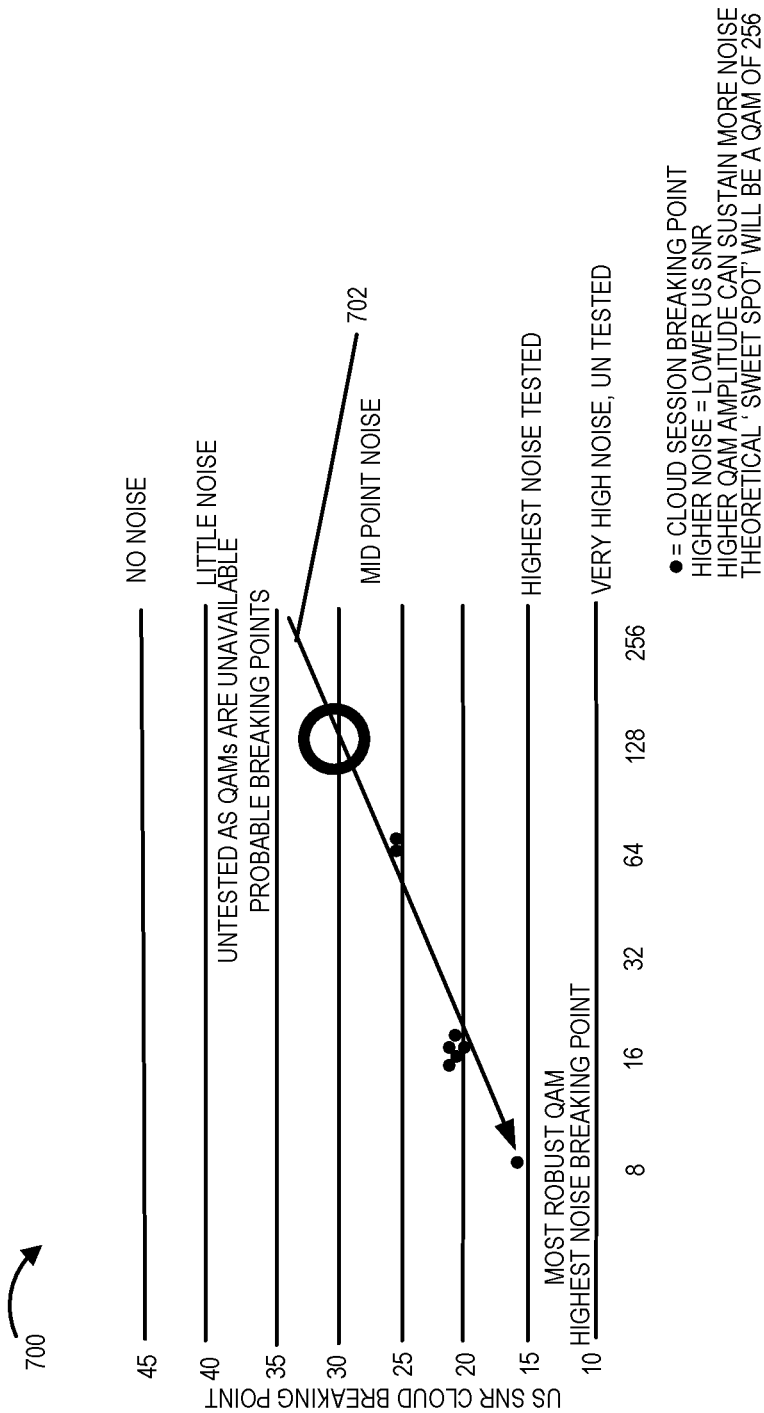
FIG. 7 is a graph which plots upstream signal to noise ratio cloud breaking point vs. Quadrature Amplitude Level.

FIG. 7 illustrates a graph 700 plotting test results of upstream communication channel signal to noise ratio cloud breaking point vs. QAM level used by a cluster node for downstream communications to customer premise devices. The upstream SNR cloud breaking points are shown in dBmv units. The graph also correlates no noise, little noise, mid-point noise, highest noise tested, and very high noise (untested) levels to the upstream SNR cloud breaking points. For example, highest noise tested level was upstream signal to noise ratio 15 dBmv. Line 702 illustrates that the lower the QAM level the more robust the system that is lower QAM level although for much higher noise before the cloud breaking point is reached. By way of illustration QAM level 256 has a upstream signal to noise breaking point of approximately 34 or 35 dBmv whereas a 16 QAM level has a upstream SNR cloud breaking point of approximately 19 to 21 dBmv. While there is no direct causation between downstream SNR and loss of cloud upstream SNR empirical data has shown that they are related can be used in determining and adjusting QAM levels for providing cloud services so as to avoid or minimize cloud service interruptions.

The techniques of various embodiments may be implemented using software, hardware and/or a combination of software and hardware. Various embodiments are directed to apparatus, e.g., customer premise equipment devices, cable systems, network nodes, cable headend/hubsites, network monitoring node/servers, cluster controllers, cloud nodes, production nodes, cloud services servers and/or network equipment devices. Various embodiments are also directed to methods, e.g., method of controlling and/or operating cable networks, cloud networks, nodes, servers, cloud service servers, customer premise equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of providing cloud services to at least a first customer premise device, the method comprising:
    determining a first signal to noise ratio (SNR), at a first time, on a first communications channel between a first network node and a first interface of the first customer premise device;
    selecting based on the first signal to noise ratio a first selected one of a plurality of cluster nodes to use to provide at least a first cloud service via a second interface of the first customer premise device using a second communications channel, at least a first cluster node and a second cluster node in the plurality of cluster nodes using different Quadrature Amplitude Modulation (QAM) levels to communicate with customer premise devices, said first cloud service including at least one of a program guide service, video on demand service, or a call identification service; and
    using the first selected one of the plurality of cluster nodes to provide the first cloud service to the first customer premise device;
    determining a second signal to noise ratio on the first communications channel, at a second time, said second time following said first time;
    making a decision whether or not to switch from the first selected one of the plurality of cluster nodes to another one of the plurality of cluster nodes based on the second signal to noise ratio on the first communications channel, the another one of the plurality of cluster nodes using a different quadrature amplitude modulation level to communicate with customer premise devices than the first selected one of the plurality of cluster nodes; and
    wherein said step of making a decision whether or not to switch includes deciding to switch to a second one of the cluster nodes which uses a low QAM level when said second signal to noise ratio on the first communications channel is below a first signal to noise threshold used to control switching to a cluster node using a low QAM level.

2. The method of claim 1, wherein said step of making a decision whether or not to switch includes deciding to switch to one of the cluster nodes which uses a high QAM level when said second signal to noise ratio on the first communications channel is above a second signal to noise threshold used to control switching to a cluster node using a high QAM level.

3. The method of claim 1, wherein the first and second communications channels share a physical link for at least a portion of said first and second communications channels.

4. The method of claim 3, wherein the first communications channel is a downlink communications channel to the first customer premise device, said first customer premise device being a set-top box, the method further comprising:
    using Simple Network Management Protocol (SNMP) polling of the set-top box to obtain the downlink SNR from the set-top box;
    and wherein determining the first signal to noise ratio includes accessing the SNR obtained from the set-top box.

5. The method of claim 3, wherein the first communications channel is an uplink communications channel between the first communications device and the first network node, said first network node being a Cable Modem Termination System (CMTS), the first customer premise device being a set-top box, the method further comprising:
    obtaining the uplink SNR for the first communications channel from the CMTS;
    and wherein determining the first signal to noise ratio includes accessing the SNR obtained from the CMTS.

6. The method of claim 3, wherein each cluster node in the plurality of cluster nodes supports no more than a single QAM level for communicating with customer premise devices.

7. The method of claim 1, wherein said selecting is performed by a cluster controller used to control which cluster nodes provide service to individual customer premise devices.

8. A system of providing cloud services to at least a first customer premise device, the system comprising:
    a first network node;
    a first customer premise device having a first and second interface;
    a plurality of cluster nodes, said plurality of cluster nodes including at least a first cluster node and a second cluster node using different Quadrature Amplitude Modulation (QAM) levels to communicate with customer premise devices; and
    a cluster controller including:
        memory; and
        a processor that is configured to control the operation of the cluster controller to:
            determine a first signal to noise ratio, at a first time, on a first communications channel between the first network node and the first interface of the first customer premise device, and
            select based on the first signal to noise ratio a first selected one of the plurality of cluster nodes to use to provide at least a first cloud service via the second interface of the first customer premise device using a second communications channel, said first cloud service including at least one of a program guide service, video on demand service, or a call identification service;
            determine a second signal to noise ratio on the first communications channel, at a second time, said second time following said first time; and
            make a decision whether or not to switch from the first selected one of the plurality of cluster nodes to another one of the plurality of cluster nodes based on the second signal to noise ratio on the first communications channel, the another one of the plurality of cluster nodes using a different quadrature amplitude modulation level to communicate with customer premise devices than the first selected one of the plurality of cluster nodes;
wherein making a decision whether or not to switch includes deciding to switch to a second one of the cluster nodes which uses a low QAM level when said second signal to noise ratio on the first communications channel is below a first signal to noise threshold used to control switching to a cluster node using a low QAM level; and
wherein said first selected one of the plurality of cluster nodes provides the first cloud service to the first customer premise device.

9. The system of claim 8 wherein the first customer premise device is a set-top box including a cable modem.

10. The system of claim 8, wherein said to make a decision whether or not to switch includes deciding to switch to one of the cluster nodes which uses a high QAM level when said second signal to noise ratio on the first communications channel is above a second signal to noise threshold used to control switching to a cluster node using a high QAM level.

11. The system of claim 8, wherein the first and second communications channels share a physical link for at least a portion of said first and second communications channels.

12. The system of claim 11, wherein the first communications channel is a downlink communications channel to the first customer premise device, said first customer premise device being a set-top box, the system further comprising:

a network monitoring device that uses Simple Network Management Protocol (SNMP) polling of the set-top box to obtain the downlink SNR from the set-top box; and
wherein said to determine the first signal to noise ratio includes accessing the SNR obtained from the set-top box.

13. The system of claim 11, wherein the first communications channel is an uplink communications channel between the first communications device and the first network node, said first network node being a Cable Modem Termination System (CMTS), the first customer premise device being a set-top box, the system further comprising:

a network monitoring device that obtains the uplink SNR for the first communications channel from the CMTS; and
wherein said to determine the first signal to noise ratio includes accessing the SNR obtained from the CMTS.

14. The system of claim 11, wherein each cluster node in the plurality of cluster nodes supports no more than a single QAM level for communicating with customer premise devices.

15. The system of claim 8, wherein said cluster controller controls which cluster nodes provide service to individual customer premise devices.

16. The system of claim 8, wherein the plurality of cluster nodes includes at least one cluster node including a 256 QAM modulator and at least one cluster node including a 64 QAM modulator.

* * * * *